(12) United States Patent
Noureldin et al.

(10) Patent No.: US 10,690,407 B2
(45) Date of Patent: *Jun. 23, 2020

(54) NATURAL GAS LIQUID FRACTIONATION PLANT WASTE HEAT CONVERSION TO SIMULTANEOUS POWER AND POTABLE WATER USING ORGANIC RANKINE CYCLE AND MODIFIED MULTI-EFFECT-DISTILLATION SYSTEMS

(71) Applicant: Saudi Arabian Oil Company, Dhahran (SA)

(72) Inventors: Mahmoud Bahy Mahmoud Noureldin, Dhahran (SA); Akram Hamed Mohamed Kamel, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 238 days.

This patent is subject to a terminal disclaimer.

(21) Appl. No.: 15/842,434

(22) Filed: Dec. 14, 2017

(65) Prior Publication Data

US 2019/0049175 A1 Feb. 14, 2019

Related U.S. Application Data

(60) Provisional application No. 62/542,687, filed on Aug. 8, 2017.

(51) Int. Cl.
*F25J 3/02* (2006.01)
*C10G 7/00* (2006.01)
(Continued)

(52) U.S. Cl.
CPC .......... *F25J 3/0295* (2013.01); *B01D 1/0058* (2013.01); *B01D 1/26* (2013.01); *B01D 1/2896* (2013.01);
(Continued)

(58) Field of Classification Search
CPC ........ F25J 3/0209; F25J 3/0233; F25J 3/0295; B01D 1/0058; B01D 1/26; B01D 1/2896;
(Continued)

(56) References Cited

U.S. PATENT DOCUMENTS 4,907,410 A 3/1990 Chang
5,600,049 A 2/1997 Sy
(Continued)

FOREIGN PATENT DOCUMENTS

WO 2006039182 4/2006
WO 2012003525 1/2012
(Continued)

OTHER PUBLICATIONS

Zhu et al., "Hybrid vapor compression refrigeration system with an integrated ejector cooling cycle," International Journal of Refrigeration, vol. 35, 2012, 11 pages.
(Continued)

*Primary Examiner* — Brian A McCraig
(74) *Attorney, Agent, or Firm* — Fish & Richardson P.C.

(57) ABSTRACT

Certain aspects of natural gas liquid fractionation plant waste heat conversion to simultaneous power and potable water using organic Rankine cycle and modified multi-effect distillation systems can be implemented as a system that includes two heating fluid circuits thermally coupled to two sets of heat sources of a NGL fractionation plant. The system includes a power generation system that comprises an organic Rankine cycle (ORC), which includes (i) a working fluid that is thermally coupled to the first heating fluid circuit to heat the working fluid, and (ii) a first expander configured to generate electrical power from the heated working fluid. The system includes a MED system thermally coupled to the second heating fluid circuit and configured to produce potable water using at least a portion of heat from the second
(Continued)

heating fluid circuit. A control system actuates control valves to selectively thermally couple the heating fluid circuit to a portion of the heat sources of the NGL fractionation plant.

28 Claims, 17 Drawing Sheets

(51) Int. Cl.
| | |
|---|---|
| B01D 1/00 | (2006.01) |
| F01K 23/06 | (2006.01) |
| C10G 5/06 | (2006.01) |
| F01K 27/02 | (2006.01) |
| C02F 1/04 | (2006.01) |
| B01D 1/28 | (2006.01) |
| B01D 1/26 | (2006.01) |
| B01D 3/06 | (2006.01) |
| F01K 25/10 | (2006.01) |
| F01K 25/08 | (2006.01) |
| B01D 3/00 | (2006.01) |
| B01D 3/14 | (2006.01) |
| B01D 3/42 | (2006.01) |
| C02F 1/16 | (2006.01) |
| C10L 3/10 | (2006.01) |
| F01K 13/02 | (2006.01) |
| F01K 23/04 | (2006.01) |
| C02F 103/36 | (2006.01) |

(52) U.S. Cl.
CPC ............ *B01D 3/007* (2013.01); *B01D 3/065* (2013.01); *B01D 3/146* (2013.01); *B01D 3/42* (2013.01); *C02F 1/04* (2013.01); *C02F 1/16* (2013.01); *C10G 5/06* (2013.01); *C10G 7/00* (2013.01); *C10L 3/10* (2013.01); *F01K 13/02* (2013.01); *F01K 23/04* (2013.01); *F01K 23/064* (2013.01); *F01K 25/08* (2013.01); *F01K 25/10* (2013.01); *F01K 27/02* (2013.01); *F25J 3/0209* (2013.01); *F25J 3/0214* (2013.01); *F25J 3/0233* (2013.01); *F25J 3/0238* (2013.01); *F25J 3/0242* (2013.01); *F25J 3/0247* (2013.01); *C02F 2103/365* (2013.01); *C02F 2303/10* (2013.01); *C10L 2290/06* (2013.01); *C10L 2290/10* (2013.01); *C10L 2290/543* (2013.01); *F25J 2200/02* (2013.01); *F25J 2200/70* (2013.01); *F25J 2200/74* (2013.01); *F25J 2205/70* (2013.01); *F25J 2215/62* (2013.01); *F25J 2220/04* (2013.01); *F25J 2240/70* (2013.01); *F25J 2260/02* (2013.01); *F25J 2270/12* (2013.01); *F25J 2270/60* (2013.01)

(58) Field of Classification Search
CPC ........ B01D 3/007; B01D 3/065; B01D 3/146; B01D 3/42; F01K 13/02; F01K 23/04; F01K 23/064; F01K 25/08; F01K 25/10; F01K 27/02; C10G 5/06; C10G 7/00; C02F 1/04; C02F 1/16; C10L 3/10
See application file for complete search history.

(56) References Cited

U.S. PATENT DOCUMENTS

| 2,685,152 | A | 11/1997 | Sterling |
|---|---|---|---|
| 6,216,436 | B1 | 4/2001 | Ranasinghe |
| 7,257,966 | B2 | 8/2007 | Lee et al. |
| 7,458,231 | B1 | 12/2008 | Vanden |
| 8,776,703 | B2 | 7/2014 | Hall |
| 9,598,993 | B2 | 3/2017 | Younes et al. |
| 9,657,937 | B2 | 5/2017 | Niass |
| 9,745,871 | B2 | 8/2017 | Noureldin et al. |
| 9,828,885 | B2 | 11/2017 | Noureldin et al. |
| 9,851,153 | B2 | 12/2017 | Noureldin et al. |
| 9,879,918 | B2 | 1/2018 | Noureldin et al. |
| 9,891,004 | B2 | 2/2018 | Noureldin et al. |
| 2006/0056015 | A1 | 3/2006 | Mccoy |
| 2008/0174115 | A1 | 7/2008 | Lambirth |
| 2008/0190135 | A1 | 8/2008 | Mak |
| 2010/0326131 | A1 | 12/2010 | Lengert |
| 2011/0000205 | A1 | 1/2011 | Hauer |
| 2013/0341929 | A1 | 12/2013 | Ho |
| 2014/0223911 | A1 | 8/2014 | Ikegami |
| 2015/0377079 | A1 | 12/2015 | Noureldin et al. |
| 2016/0369674 | A1 | 12/2016 | Younes et al. |
| 2017/0058708 | A1 | 3/2017 | Noureldin et al. |
| 2017/0058711 | A1 | 3/2017 | Noureldin et al. |
| 2017/0058719 | A1 | 3/2017 | Noureldin et al. |
| 2017/0058721 | A1 | 3/2017 | Noureldin et al. |
| 2019/0048759 | A1 | 2/2019 | Noureldin et al. |

FOREIGN PATENT DOCUMENTS

| WO | 2017035150 | 3/2017 |
|---|---|---|
| WO | 2017035166 | 3/2017 |

OTHER PUBLICATIONS

M. Mehrpooya et al., "Introducing a novel integrated NGL recovery process configuration (with a self-refrigeration system (open-closed cycle)) with minimum energy requirement," Chemical Engineering and Processing: Process Intensification, Apr. 2010, vol. 49, No. 4, pp. 376-388.

Rahimi et al., "A novel process for low grade heat driven desalination," Desalination, Oct. 15, 2014, vol. 351, pp. 202-212.

International Search Report and Written Opinion issued in International Application No. PCT/US2018/045554 dated Nov. 22, 2018, 21 pages.

International Search Report and Written Opinion issued in International Application No. PCT/US2018/045557 dated Nov. 22, 2018, 19 pages.

International Search Report and Written Opinion issued in International Application No. PCT/US2018/045550 dated Nov. 22, 2018, 18 pages.

International Search Report and Written Opinion issued in International Application No. PCT/US2018/045629 dated Nov. 22, 2018, 16 pages.

International Search Report and Written Opinion issued in International Application No. PCT/US2018/045531 dated Nov. 22, 2018, 20 pages.

International Search Report and Written Opinion issued in International Application No. PCT/US2018/045547 dated Nov. 22, 2018, 20 pages.

International Search Report and Written Opinion issued in International Application No. PCT/US2018/045640 dated Nov. 22, 2018, 19 pages.

International Search Report and Written Opinion issued in International Application No. PCT/US2018/045535 dated Nov. 22, 2018, 23 pages.

International Search Report and Written Opinion issued in International Application No. PCT/US2018/045558 dated Nov. 22, 2018, 22 pages.

International Search Report and Written Opinion issued in International Application No. PCT/US2018/045541 dated Nov. 22, 2018, 17 pages.

International Search Report and Written Opinion issued in International Application No. PCT/US2018/045537 dated Nov. 22, 2018, 16 pages.

GCC Examination Report in GCC Appln. No. GC 2018-35801, dated Feb. 9, 2020, 4 pages.

GCC Examination Report in GCC Appln. No. GC 2018-35799, dated Feb. 9, 2020, 4 pages.

(56) References Cited

OTHER PUBLICATIONS

GCC Examination Report in GCC Appln. No. GC 2018-35795, dated Feb. 9, 2020, 3 pages.
Gulf Cooperation Council Examination Report issued in GCC Application No. GC 2018-35796 dated Dec. 30, 2019, 5 pages.
Gulf Cooperation Council Examination Report issued in GCC Application No. GC 2018-35802 dated Dec. 30, 2019, 6 pages.
Gulf Cooperation Council Examination Report issued in GCC Application No. GC 2018-35793 dated Dec. 30, 2019, 5 pages.
Gulf Cooperation Council Examination Report issued in GCC Application No. GC 2018-35800 dated Dec. 30, 2019, 5 pages.
GCC Examination Report in GCC Appln. No. GC 2018-357994, dated Jan. 29, 2020, 6 pages.
International Search Report and Written Opinion issued in International Application No. PCT/US2018/045564 dated Nov. 22, 2018, 21 pages.
International Search Report and Written Opinion issued in International Application No. PCT/US2018/045622 dated Nov. 22, 2018, 18 pages.
Neill and Gunter, "Generation of Electric Power from Waste Heat in the Western Canadian Oil and Gas Industry Phase 1 Report-Scoping Evaluations Rev A," Petroleum Technology Alliance Canada (PTAC), Oct. 2007, 148 pages.
Bahnassi et al., "Achieving product specifications for ethane through to pentane plus from NGL fraction plants," AIChE Fall Conference, Jan. 1, 2005, 21 pages.
Rosenzweig, "Cryogenics for natural gas extraction/fractionation," Chemical engineering, access intelligence association, vol. 1, No. 77, Jan. 12, 1970, 3 pages.
Zhang et al., "Network modeling and design for low grade heat recovery, refrigeration, and utilization in Industrial parks," Industrial and Engineering Chemistry Research, vol. 55, No. 36, Sep. 14, 2016, 13 pages.
Kwak et al., "Integrated design and optimization of technologies for utilizing low grade heat in process industries," Applied Energy, vol. 131, Oct. 1, 2014, 16 pages.
Lira-Barragan et al., "Sustainable Integration of Trigeneration Systems with Head Exchanger Networks," Industrial & Engineering Chemistry, Research, vol. 53, No. 7, Feb. 4, 2014, 19 pages.
Ammar et al., "Low grade thermal energy sources and uses from the process industry in the UK," Applied Energy, Elsevier Science Publishers, vol. 89, No. 1, Jun. 1, 2011, 18 pages.
Gaberiel et al., "Optimization across the water-energy nexus for integrating heat, power, and water for industrial processes, couples with the hybrid thermal-membrane dealination," Industrial and Engineering Chemistry Research, vol. 55, No. 12, Feb. 16, 2016, 25 pages.
Gonzalez-Bravo et al., "Optimal Design for Water Desalination Systems Involving Waste Heat Recovery," Industrial and Engineering Chemistry Research, vol. 56, No. 7, Feb. 8, 2017, 14 pages.
Ophir et al., "Advanced Med process for most economical sea water desalination," Desalination, Elsevier, Amsterdam, NL, vol. 182, No. 1-3, Nov. 1, 2005, 12 pages.
Gnaneswar Gude et al., "Feasibility study of a new two-stage low temperature desalination process," Energy Conversation and Management, Elsevier Science Publishers, vol. 56, Nov. 30, 2011, 7 pages.

NATURAL GAS LIQUID FRACTIONATION PLANT WASTE HEAT CONVERSION TO SIMULTANEOUS POWER AND POTABLE WATER USING ORGANIC RANKINE CYCLE AND MODIFIED MULTI-EFFECT-DISTILLATION SYSTEMS

CROSS-REFERENCE TO RELATED APPLICATIONS

This disclosure claims the benefit of priority to U.S. Application Ser. No. 62/542,687 entitled "Utilizing Waste Heat Recovered From Natural Gas Liquid Fractionation Plants," which was filed on Aug. 8, 2017, the entire contents of which are incorporated herein by reference.

TECHNICAL FIELD

This disclosure relates to operating industrial facilities, for example, a natural gas liquid fractionation plant or other industrial facilities that include operating plants that generate heat, for example, a natural gas liquid fractionation plant.

BACKGROUND

Natural gas liquid (NGL) processes are chemical engineering processes and other facilities used in petroleum refineries to transform natural gas into products, for example, liquefied petroleum gas (LPG), gasoline, kerosene, jet fuel, diesel oils, fuel oils, and such products. NGL facilities are large industrial complexes that involve many different processing units and auxiliary facilities, for example, utility units, storage tanks, and such auxiliary facilities. Each refinery can have its own unique arrangement and combination of refining processes determined, for example, by the refinery location, desired products, economic considerations, or such factors. The NGL processes that are implemented to transform the natural gas into the products such as those listed earlier can generate heat, which may not be reused, and byproducts, for example, greenhouse gases (GHG), which may pollute the atmosphere. It is believed that the world's environment has been negatively affected by global warming caused, in part, due to the release of GHG into the atmosphere.

SUMMARY

This specification describes technologies relating to cooling capacity generation, power generation or potable water production from waste heat in a natural gas liquid (NGL) fractionation plant.

The present disclosure includes one or more of the following units of measure with their corresponding abbreviations, as shown in Table 1:

TABLE 1

| Unit of Measure | Abbreviation |
| --- | --- |
| Degrees Celsius | ° C. |
| Megawatts | MW |
| One million | MM |
| British thermal unit | Btu |
| Hour | h |
| Pounds per square inch (pressure) | psi |
| Kilogram (mass) | Kg |
| Second | S |
| Cubic meters per day | m³/day |
| Fahrenheit | F. |

In an example implementation, a system includes a first heating fluid circuit thermally coupled to a first multiple heat sources of a natural gas liquid (NGL) fractionation plant. The system includes a second heating fluid circuit thermally coupled to at least one second heat source of the NGL fractionation plant. The system includes a power generation system that comprises an organic Rankine cycle (ORC), which includes (i) a working fluid that is thermally coupled to the first heating fluid circuit to heat the working fluid, and (ii) a first expander configured to generate electrical power from the heated working fluid. The system includes a multi-effect-distillation (MED) system thermally coupled to the second heating fluid circuit and configured to produce potable water using at least a portion of heat from the second heating fluid circuit. The system includes a control system configured to actuate a first set of control valves to selectively thermally couple the first heating fluid circuit to at least a portion of the first plurality of heat sources of the NGL fractionation plant. The control system is further configured to actuate a second set of control valves to selectively thermally couple the second heating fluid circuit to the at least one second heat source of the NGL fractionation plant.

In an aspect combinable with the example implementation, the MED system includes multiple trains thermally coupled to the second heating fluid circuit.

In another aspect combinable with any of the previous aspects, the multiple trains include three trains, a first train including six effects, a second train including four effects, and a third train including two effects.

In another aspect combinable with any of the previous aspects, the working fluid is thermally coupled to the first heating fluid circuit in an evaporator of the ORC.

In another aspect combinable with any of the previous aspects, the system includes a heating fluid tank that is fluidly coupled to the evaporator of the ORC.

In another aspect combinable with any of the previous aspects, the working fluid includes isobutene.

In another aspect combinable with any of the previous aspects, the first and second heating fluid circuits include water or oil.

In another aspect combinable with any of the previous aspects, the system includes a condenser fluidly coupled to the expander and to a condenser fluid source to cool the working fluid, and a pump to circulate the working fluid through the ORC.

In another aspect combinable with any of the previous aspects, the multiple heat sources include a first portion of sub-units of the NGL fractionation plant that includes an ethane system, a second multiple sub-units of the NGL fractionation plant that includes a propane system, a third portion of sub-units of the NGL fractionation plant that includes a butane system, a fourth portion of sub-units of the NGL fractionation plant that includes a pentane system, a fifth portion of sub-units of the NGL fractionation plant that includes a natural gasoline system; and a sixth portion of sub-units of the NGL fractionation plant that includes a solvent regeneration system.

In another aspect combinable with any of the previous aspects, the first portion of sub-units of the NGL fractionation plant includes at least two ethane system heat sources, which includes a first propane system heat source that includes a heat exchanger that is thermally coupled to an outlet stream of a propane dehydrator, a second propane system heat source that includes a heat exchanger that is thermally coupled to an outlet stream of a depropanizer overhead stream, a third propane system heat source that includes a heat exchanger that is thermally coupled to an outlet stream of a propane vapor recovery compressor stream, a fourth propane system heat source that includes a heat exchanger that is thermally coupled to an outlet stream of a propane refrigeration compressor stream, and a fifth propane system heat source that includes a heat exchanger that is thermally coupled to an outlet stream of a propane main compressor stream.

In another aspect combinable with any of the previous aspects, the third portion of sub-units of the NGL fractionation plant includes at least four butane system heat sources, including a first butane system heat source that includes a heat exchanger that is thermally coupled to an outlet stream of a butane dehydrator, a second butane system heat source that includes a heat exchanger that is thermally coupled to an outlet stream of a debutanizer overhead stream, a third butane system heat source that includes a heat exchanger that is thermally coupled to an outlet stream of a debutanizer bottoms, and a fourth butane system heat source that includes a heat exchanger that is thermally coupled to an outlet stream of a butane refrigeration compressor stream.

In another aspect combinable with any of the previous aspects, the fourth portion of sub-units of the NGL fractionation plant includes at least one pentane system heat source, which includes a first pentane system heat source that includes a heat exchanger that is thermally coupled to an outlet stream of a depentanizer overhead stream.

In another aspect combinable with any of the previous aspects, the fifth portion of sub-units of the NGL fractionation plant includes at least three natural gasoline system heat sources, which includes a first natural gasoline system heat source that includes a heat exchanger that is thermally coupled to an outlet stream of a natural gasoline decolorizing section pre-flash drum overhead stream, and a second natural gasoline system heat source that includes a heat exchanger that is thermally coupled to an outlet stream of a natural gasoline decolorizer overhead stream, and a third natural gasoline system heat source that includes a heat exchanger that is thermally coupled to an outlet stream of a Reid vapor pressure control column overhead stream.

In another aspect combinable with any of the previous aspects, the sixth portion of sub-units of the NGL fractionation plant includes at least two solvent regeneration system heat sources, which includes a first solvent regeneration system heat source that includes a heat exchanger that is thermally coupled to an outlet stream of an ADIP regeneration section overhead stream, and a second solvent regeneration system heat source that includes a heat exchanger that is thermally coupled to an outlet stream of an ADIP regeneration section bottoms.

In another aspect combinable with any of the previous aspects, the at least one second heat source includes at least one propane system heat source that includes a heat exchanger that is thermally coupled to an outlet stream of a depropanizer overhead stream.

In another example implementation, a method includes circulating a first heating fluid through a first heating fluid circuit thermally coupled to a first plurality of heat sources of a natural gas liquid (NGL) fractionation plant; circulating a second heating fluid through a second heating fluid circuit thermally coupled to at least one second heat source of the NGL fractionation plant; generating electrical power through a power generation system that includes an organic Rankine cycle (ORC), which includes (i) a working fluid that is thermally coupled to the first heating fluid circuit to heat the working fluid, and (ii) a expander configured to generate the electrical power from the heated working fluid; producing potable water with a multi-effect-distillation (MED) system that is thermally coupled to the second heating fluid circuit from heat transferred to the MED system from the second heating fluid circuit; actuating a first set of control valves to selectively thermally couple the first heating fluid circuit to at least a portion of the first plurality of heat sources of the NGL fractionation plant; and actuating a second set of control valves to selectively thermally couple the second heating fluid circuit to the at least one second heat source of the NGL fractionation plant.

In an aspect combinable with the example implementation, the MED system includes multiple trains thermally coupled to the second heating fluid circuit.

In another aspect combinable with any of the previous aspects, the multiple trains include three trains, a first train including six effects, a second train including four effects, and a third train including two effects.

In another aspect combinable with any of the previous aspects, the working fluid is thermally coupled to the first heating fluid circuit in an evaporator of the ORC.

In another aspect combinable with any of the previous aspects, the system includes a heating fluid tank that is fluidly coupled to the evaporator of the ORC.

In another aspect combinable with any of the previous aspects, the working fluid includes isobutene.

In another aspect combinable with any of the previous aspects, the first and second heating fluid circuits include water or oil.

In another aspect combinable with any of the previous aspects, the system includes a condenser fluidly coupled to the expander and to a condenser fluid source to cool the working fluid, and a pump to circulate the working fluid through the ORC.

In another aspect combinable with any of the previous aspects, the multiple heat sources include a first portion of sub-units of the NGL fractionation plant that includes an ethane system, a second multiple sub-units of the NGL fractionation plant that includes a propane system, a third portion of sub-units of the NGL fractionation plant that includes a butane system, a fourth portion of sub-units of the NGL fractionation plant that includes a pentane system, a fifth portion of sub-units of the NGL fractionation plant that includes a natural gasoline system; and a sixth portion of sub-units of the NGL fractionation plant that includes a solvent regeneration system.

In another aspect combinable with any of the previous aspects, the first portion of sub-units of the NGL fractionation plant includes at least two ethane system heat sources, which includes a first propane system heat source that includes a heat exchanger that is thermally coupled to an outlet stream of a propane dehydrator, a second propane system heat source that includes a heat exchanger that is thermally coupled to an outlet stream of a depropanizer overhead stream, a third propane system heat source that includes a heat exchanger that is thermally coupled to an outlet stream of a propane vapor recovery compressor stream, a fourth propane system heat source that includes a heat exchanger that is thermally coupled to an outlet stream of a propane refrigeration compressor stream, and a fifth propane system heat source that includes a heat exchanger that is thermally coupled to an outlet stream of a propane main compressor stream.

In another aspect combinable with any of the previous aspects, the third portion of sub-units of the NGL fractionation plant includes at least four butane system heat sources, including a first butane system heat source that includes a heat exchanger that is thermally coupled to an outlet stream of a butane dehydrator, a second butane system heat source that includes a heat exchanger that is thermally coupled to an outlet stream of a debutanizer overhead stream, a third butane system heat source that includes a heat exchanger that is thermally coupled to an outlet stream of a debutanizer bottoms, and a fourth butane system heat source that includes a heat exchanger that is thermally coupled to an outlet stream of a butane refrigeration compressor stream.

In another aspect combinable with any of the previous aspects, the fourth portion of sub-units of the NGL fractionation plant includes at least one pentane system heat source, which includes a first pentane system heat source that includes a heat exchanger that is thermally coupled to an outlet stream of a depentanizer overhead stream.

In another aspect combinable with any of the previous aspects, the fifth portion of sub-units of the NGL fractionation plant includes at least three natural gasoline system heat sources, which includes a first natural gasoline system heat source that includes a heat exchanger that is thermally coupled to an outlet stream of a natural gasoline decolorizing section pre-flash drum overhead stream, and a second natural gasoline system heat source that includes a heat exchanger that is thermally coupled to an outlet stream of a natural gasoline decolorizer overhead stream, and a third natural gasoline system heat source that includes a heat exchanger that is thermally coupled to an outlet stream of a Reid vapor pressure control column overhead stream.

In another aspect combinable with any of the previous aspects, the sixth portion of sub-units of the NGL fractionation plant includes at least two solvent regeneration system heat sources, which includes a first solvent regeneration system heat source that includes a heat exchanger that is thermally coupled to an outlet stream of an ADIP regeneration section overhead stream, and a second solvent regeneration system heat source that includes a heat exchanger that is thermally coupled to an outlet stream of an ADIP regeneration section bottoms.

In another aspect combinable with any of the previous aspects, the at least one second heat source includes at least one propane system heat source that includes a heat exchanger that is thermally coupled to an outlet stream of a depropanizer overhead stream.

The details of one or more implementations of the subject matter described in this specification are set forth in the accompanying drawings and the detailed description. Other features, aspects, and advantages of the subject matter will become apparent from the description, the drawings, and the claims.

DETAILED DESCRIPTION

NGL Plant

Figure 1A:
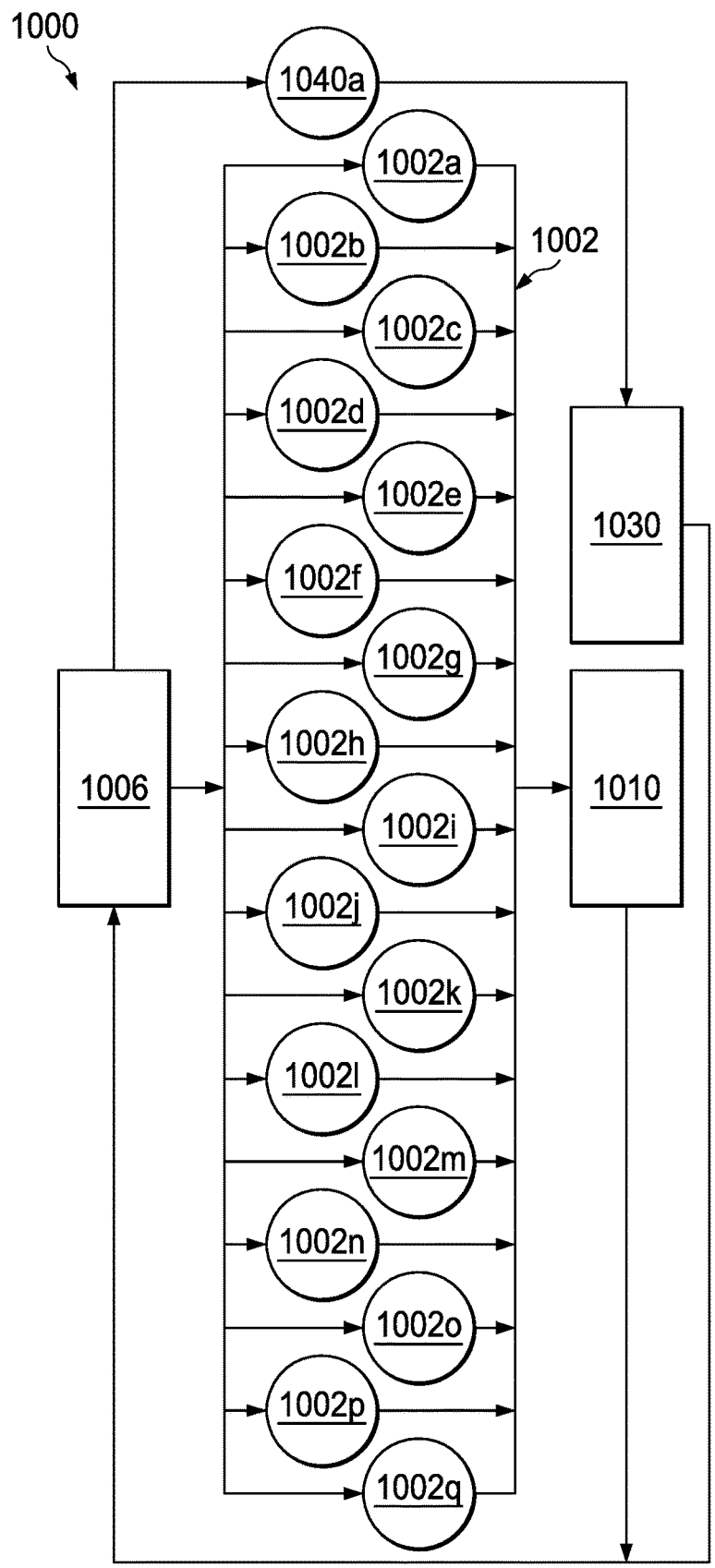
FIG. 1A is a schematic diagram of a system to recover waste heat from heat sources in a NGL fractionation plant.

Gas processing plants can purify raw natural gas or crude oil production associated gases (or both) by removing common contaminants such as water, carbon dioxide and hydrogen sulfide. Some of the substances which contaminate natural gas have economic value and can be processed or sold or both. Upon the separation of methane gas, which is useful as sales gas for houses and power generation, the remaining hydrocarbon mixture in liquid phase is called natural gas liquids (NGL). The NGL is fractionated in a separate plant or sometimes in the same gas processing plant into ethane, propane and heavier hydrocarbons for several versatile uses in chemical and petrochemical as well as transportation industries. The NGL fractionation plant uses the following processes or sections: fractionation, product treating, and natural gasoline processing. The fractionation processes or sections can include heat sources (also commonly referred to as streams) including, but not limited to, a propane condenser, a propane refrigerant condenser, a naphtha cooler, a depentanizer condenser, an amine-di-isopropanol (ADIP) cooler, a regenerator overhead (OVHD) condenser, a Reid vapor pressure (RVP) column condenser, a depropanizer condenser, a debutanizer condenser, or combinations thereof. The product treating processes or sections can include the following non-limiting heat sources: a propane dehydrator condenser, a butane dehydrator condenser, a propane condenser, an air-cooled condenser, a regeneration gas cooler, and a butane condenser, or combinations thereof. The natural gasoline processing processes or sections can include, but are not limited to, a natural gasoline (NG) flash vapor condenser, a NG decolorizer condenser, or combinations thereof.

Fractionation Section

Fractionation is the process of separating the different components of natural gas. Separation is possible because each component has a different boiling point. At temperatures less than the boiling point of a particular component, that component condenses to a liquid. It is also possible to increase the boiling point of a component by increasing the pressure. By using columns operating at different pressures and temperatures, the NGL fractionation plant is capable of separating ethane, propane, butane, pentane, or combinations thereof (with or without heavier associated hydrocarbons) from NGL fractionation feeds. Deethanizing separates ethane from C2+ NGL, where C2 refers to a molecule containing two carbon atoms (ethane), and where C2+ refers to a mixture containing molecules having two or more carbon atoms, for example, a NGL containing C2, C3, C4, C5 can be abbreviated as "C2+ NGL." Depropanizing and debutanizing separate propane and butane, respectively, from C3+ NGL and C4+NGL, respectively. Because the boiling points of heavier natural gases are closer to each other, such gases can be harder to separate compared to lighter natural gases. Also, a rate of separation of heavier components is less than that of comparatively lighter components. In some instances, the NGL fractionation plant can implement, for example, about 45 distillation trays in the deethanizer, about 50 trays in the depropanizer, and about 55 trays in the debutanizer.

The fractionation section can receive a feed gas containing C2+ NGL from gas plants, which are upstream plants that condition and sweeten the feed gas, and produce a sales gas, such as a C1/C2 mixture, where C1 is about 90%, as a final product. The C2+ NGL from gas plants can be further processed in the NGL fractionation plant for C2+ recovery. From feed metering or surge unit metering (or both), feed flows to the three fractionation modules, namely, the deethanizing module, the depropanizing module and the debutanizing module, each of which is described later.

Deethanizer Module (or Deethanizer Column)

The C2+ NGL is pre-heated before entering the deethanizer column for fractionation. The separated ethane leaves the column as overhead gas. The ethane gas is condensed by a closed-loop propane refrigeration system. After being cooled and condensed, the ethane is a mixture of gas and liquid. The liquid ethane is separated and pumped back to the top of the column as reflux. The ethane gas is warmed in an economizer and then sent to users. The bottoms product from the deethanizer reboiler is C3+ NGL, which is sent to the depropanizer module.

Depropanizer Module (or Depropanizer Column)

From the deethanizer module, C3+ NGL enters the depropanizer module for fractionation. The separated propane leaves the column as overhead gas. The gas is condensed using coolers. The propane condensate is collected in a reflux drum. Some of the liquid propane is pumped back to the column as reflux. The rest of the propane is either treated or sent to users as untreated product. The bottoms product from the depropanizer reboiler, C4+ is then sent to the debutanizer module Debutanizer Module (or Debutanizer Column)

C4+ enters the debutanizer module for fractionation. The separated butane leaves the column as overhead gas. The gas is condensed using coolers. The butane condensate is collected in a reflux drum. Some of the liquid butane is pumped back to the column as reflux. The rest of the butane is either treated or sent to users as untreated product. The bottoms product from the debutanizer reboiler, C5+ natural gas (NG) goes on to a RVP control section (which may also be referred to as a rerun unit), which will be discussed in greater detail in a later section.

Product Treating Section

While ethane requires no further treatment, propane and butane products are normally treated to remove hydrogen sulfide ($H_2S$), carbonyl sulfide (COS), and mercaptan sulfur (RSH). Then, the products are dried to remove any water. All exported product is treated, while untreated products can go to other industries. As described later, propane receives ADIP treating, MEROX™ (Honeywell UOP; Des Plaines, Ill.) treating, and dehydration. Butane receives MEROX treating, and dehydration.

ADIP Treating Section

ADIP is a solution of di-isopropanol amine and water. ADIP treating extracts $H_2S$ and COS from propane. The ADIP solution, through contact with the sour propane, absorbs the $H_2S$ and COS. The ADIP solution first contacts the sour propane in an extractor. In the extractor, the ADIP absorbs most of the $H_2S$ and some of the COS. The propane then passes through a mixer/settler train where the propane contacts with ADIP solution to extract more $H_2S$ and COS. This partially sweetened propane is cooled and then washed with water to recover the ADIP entrained with the propane. The propane is then sent to MEROX treating, which is described later. The rich ADIP that has absorbed the $H_2S$ and COS leaves the bottom of the extractor and is regenerated into lean ADIP for reuse. The regenerator column has a temperature and pressure that are suitable for acid gas removal. When the rich ADIP enters the regenerator, the entrained acid gases are stripped. As the acid gases leaves the regenerator as overhead, any free water is removed to prevent acid formation. The acid gases are then sent to flare. The lean ADIP leaves the extractor bottom and is cooled and filtered. Lean ADIP returns to the last mixer/settler and flows back through the system in the counter-current direction of the propane to improve contact between the propane and ADIP, which improves $H_2S$ and COS extraction.

C3/C4 MEROX Treating Section

MEROX treating removes mercaptan sulfur from C3/C4 product. Mercaptans are removed using a solution of sodium hydroxide (NaOH), also known by the commercial name caustic soda (hereinafter referred to as "caustic") and MEROX. The MEROX catalyst facilitates the oxidation of mercaptans to disulfides. The oxidation takes place in an alkaline environment, which is provided by using the caustic solution. MEROX treating for C3 and C4 is similar. Both products are prewashed with caustic to remove any remaining traces of $H_2S$, COS, and $CO_2$. This prevents damage to the caustic that is used in MEROX treating. After prewashing, product flows to an extractor, where a caustic solution with MEROX catalyst contacts with the product. The caustic/catalyst solution converts the mercaptans into mercaptides. The sweetened product, which is lean on acid gases, leaves the extractor as overhead and any remaining caustic is separated. Caustic leaves the bottom of both product extractors rich with mercaptides. The rich caustic is regenerated into lean caustic for reuse. The C3/C4 extraction sections share a common caustic regeneration section, namely, an oxidizer. Before entering the bottom of the oxidizer, the rich caustic is injected with MEROX catalyst to maintain proper catalyst concentration, heated, and mixed with process air. In the oxidizer, the mercaptides are oxidized into disulfides. The mixture of disulfides, caustic, and air leave the oxidizer as overhead. The air, disulfide gases, and disulfide oil are separated from the regenerated caustic. The regenerated caustic is pumped to the C3/C4 extractor. Regenerated caustic with any residual disulfides is washed with NG in the NG wash settler.

C3/C4 Dehydration Section

Propane or butane products (or both) contain water when they leave MEROX treating. Dehydration removes moisture in such products through adsorption before the products flow to refrigeration and storage. The dehydration processes for C3 and C4 are similar. Both C3/C4 dehydration sections have two dehydrators containing molecular sieve desiccant beds. One dehydrator is in service while the other undergoes regeneration. Regeneration consists of heating the sieve beds to remove moisture, then cooling the beds before reuse. During drying, product flows up and through the molecular sieve bed, which adsorbs (that is, binds to its surface) moisture. From the top of the dehydrator, dry C3/C4 products flow to refrigeration.

Natural Gasoline (NG) Processing Section

NG processing includes RVP control, decolorizing and depentanizing sections.

RVP Control Section

A Reid vapor pressure (RVP) control section (or rerun unit) is a fractionator column that receives the C5+ NG from the debutanizer bottom. The RVP control section collects a pentane product. The RVP control section can be used to adjust the RVP of the pentane product at a rerun fractionator overhead before the pentane product is sent to a pentane storage tank. RVP is a measure of the ability of a hydrocarbon to vaporize. RVP (sometimes called volatility) is an important specification in gasoline blending. The RVP control section stabilizes the RVP of NG by removing small amounts of pentane. Depending on operational requirements, the RVP control section can be totally or partially bypassed. NG from the debutanizer bottoms goes to the RVP column where a controlled amount of pentane is stripped and leaves the column as overhead gas. As in NGL fractionation, the overhead gas is condensed with coolers, and some of the condensate is pumped back to the column as reflux. The remaining pentane is cooled and sent to storage. If the RVP column bottoms product (NG) meets color specifications, it is sent to storage. If not, it is sent to decolorizing.

Decolorizing Section

The decolorizing section removes color bodies from NG. Color bodies are traces of heavy ends found in the debutanizer bottoms product. Other impurities such as corrosion products from the pipeline may also be present. These must be removed for NG to meet the color specification. Decolorizer feed can be RVP column bottoms product or debutanizer bottoms product, or a combination of both. Additional natural gasoline can also be supplied from other facilities to maintain a hexane plus (C6+) product supply. If decolorizing is needed, NG first passes through a pre-flash-drum. A large portion of the lighter NG components vaporizes and leaves the drum as overhead. The heavier NG components remain along with the color bodies and are fed to the decolorizer column, where the remaining color bodies are separated. The NG leaves the decolorizer as overhead gas and is condensed and collected in the NG product drum, with some pumped back to the column as reflux. Overhead from the column and flash drum are joined and pumped to either the depentanizer (described later) or cooled and sent to storage in the feed product surge unit. The color bodies leave the decolorizer as bottoms product and are pumped to the feed and surge unit to be injected into a crude line.

Depentanizing Section

Depentanizing uses a fractionation column to produce a pentane overhead product and a C6+ bottoms product. Both the pentane product and the C6+ bottoms product are separately fed to storage or downstream the petrochemical plants. The feed to the depentanizer is the NG product stream from the decolorizing section. Feed can be increased or decreased based on the demand for C6+ bottoms product. If the NGL fractionation plant NG production cannot meet demand, NG can be imported from oil refineries. The decolorized NG is preheated before entering the depentanizer. The separated pentane leaves the column as overhead gas. The overhead condensers cool the overhead stream, and some is pumped back to the column as reflux. The remaining pentane is cooled and sent to storage. Light NG in the bottoms is vaporized and returned to heat the depentanizer. The remaining bottoms product is cooled and sent to storage as C6+.

Table 2 lists duty per train of major waste heat streams in an example of an NGL fractionation plant.

TABLE 2

| Stream Name | Duty/train (MMBtu/h) |
| --- | --- |
| Propane refrigerant condenser | 94 |
| Propane dehydration condenser | 22 |
| Butane dehydrator condenser | 9 |
| Naphtha cooler | 11 |
| Depentanizer condenser | 100 |
| ADIP cooler | 73 |
| Regenerator OVHD condenser | 18 |
| NG flash vapor condenser | 107 |
| NG decolorizer condenser | 53 |
| Natural gasoline (cooling) process propane condenser | 29 |
| Fractionation propane condenser | 81 |
| Air cooled condenser | 16 |
| Regeneration gas cooler | 22 |
| RVP column condenser | 36 |
| Butane condenser | 49 |
| Depropanizer condenser | 194 |
| Debutanizer condenser | 115 |

In Table 2, "Duty/train" represents each stream's thermal duty in millions Btu per hour (MMBtu/h) per processing train. A typical NGL fractionation plant includes three to four processing trains.

The systems described in this disclosure can be integrated with a NGL fractionation plant to make the fractionation plant more energy efficient or less polluting or both. In particular, the energy conversion system can be implemented to recover low grade waste heat from the NGL fractionation plant. Low grade waste heat is characterized by a temperature difference between a source and sink of the low grade heat steam being between 65° C. and 232° C. (150° F. and 450° F.). The NGL fractionation plant is an attractive option for integration with energy conversion systems due to a large amount of low grade waste heat generated by the plant and an absence of a need for deep cooling. Deep cooling refers to a temperature that is less than ambient that uses a refrigeration cycle to maintain.

The low grade waste heat from an NGL fractionation plant can be used for commodities such as carbon-free power generation, cooling capacity generation, potable water production from sea water, or combinations thereof. Low grade waste heat is characterized by a temperature ranging between 65° C. and 232° C. (150° F. to 450° F.). The waste heat can be used for the mono-generation, co-generation, or tri-generation of one or more or all of the commodities mentioned earlier. Low grade waste heat from the NGL fractionation plant can be used to provide in-plant sub-ambient cooling, thus reducing the consumption of power or fuel (or both) of the plant. Low grade waste heat from the NGL fractionation plant can be used to provide ambient air conditioning or cooling in the industrial community or in a nearby non-industrial community, thus helping the community to consume energy from alternative sources. In addition, the low grade waste heat can be used to desalinate water and produce potable water to the plant and adjacent community. An NGL fractionation plant is selected for low grade waste heat recovery because of a quantity of low grade waste heat available from the NGL fractionation plant as well as a cooling requirement of the plant to ambient temperature cooling (instead of deep cooling).

The energy conversion systems described in this disclosure can be integrated into an existing NGL fractionation plant as a retrofit or can be part of a newly constructed NGL fractionation plant. A retrofit to an existing NGL fractionation plant allows the carbon-free power generation, and fuel savings advantages offered by the energy conversion systems described here to be accessible with a reduced capital investment. For example, the energy conversion systems described here can produce one or more or all of substantially between 35 MW and 40 MW (for example, 37 MW) of carbon-free power, substantially between 100,000 and 150,000 m$^3$/day (for example, 120,000 m$^3$/day) of desalinated water, and substantially between 350 MM BTU/h and 400 MM BTU/h (for example, 388 MM BTU/h) of cooling capacity for in-plant or community utilization or both.

As described later, the systems for waste heat recovery and re-use from the NGL fractionation plant can include modified multi-effect distillation (MED) systems, customized Organic Rankine Cycle (ORC) systems, unique ammonia-water mixture Kalina cycle systems, customized modified Goswami cycle systems, mono-refrigerant specific vapor compression-ejector-expander triple cycle systems, or combinations of one or more of them. Details of each disclosure are described in the following paragraphs.

Heat Exchangers

In the configurations described in this disclosure, heat exchangers are used to transfer heat from one medium (for example, a stream flowing through a plant in a NGL fractionation plant, a buffer fluid or such medium) to another medium (for example, a buffer fluid or different stream flowing through a plant in the NGL fractionation plant). Heat exchangers are devices which transfer (exchange) heat typically from a hotter fluid stream to a relatively less hotter fluid stream. Heat exchangers can be used in heating and cooling applications, for example, in refrigerators, air conditions or such cooling applications. Heat exchangers can be distinguished from one another based on the direction in which fluids flow. For example, heat exchangers can be parallel-flow, cross-flow or counter-current. In parallel-flow heat exchangers, both fluid involved move in the same direction, entering and exiting the heat exchanger side-by-side. In cross-flow heat exchangers, the fluid path runs perpendicular to one another. In counter-current heat exchangers, the fluid paths flow in opposite directions, with one fluid exiting whether the other fluid enters. Counter-current heat exchangers are sometimes more effective than the other types of heat exchangers.

In addition to classifying heat exchangers based on fluid direction, heat exchangers can also be classified based on their construction. Some heat exchangers are constructed of multiple tubes. Some heat exchangers include plates with room for fluid to flow in between. Some heat exchangers enable heat exchange from liquid to liquid, while some heat exchangers enable heat exchange using other media.

Heat exchangers in a NGL fractionation plant are often shell and tube type heat exchangers which include multiple tubes through which fluid flows. The tubes are divided into two sets—the first set contains the fluid to be heated or cooled; the second set contains the fluid responsible for triggering the heat exchange, in other words, the fluid that either removes heat from the first set of tubes by absorbing and transmitting the heat away or warms the first set by transmitting its own heat to the fluid inside. When designing this type of exchanger, care must be taken in determining the correct tube wall thickness as well as tube diameter, to allow optimum heat exchange. In terms of flow, shell and tube heat exchangers can assume any of three flow path patterns.

Heat exchangers in NGL facilities can also be plate and frame type heat exchangers. Plate heat exchangers include thin plates joined together with a small amount of space in between, often maintained by a rubber gasket. The surface area is large, and the corners of each rectangular plate feature an opening through which fluid can flow between plates, extracting heat from the plates as it flows. The fluid channels themselves alternate hot and cold liquids, meaning that the heat exchangers can effectively cool as well as heat fluid. Because plate heat exchangers have large surface area, they can sometimes be more effective than shell and tube heat exchangers.

Other types of heat exchangers can include regenerative heat exchangers and adiabatic wheel heat exchangers. In a regenerative heat exchanger, the same fluid is passed along both sides of the exchanger, which can be either a plate heat exchanger or a shell and tube heat exchanger. Because the fluid can get very hot, the exiting fluid is used to warm the incoming fluid, maintaining a near constant temperature. Energy is saved in a regenerative heat exchanger because the process is cyclical, with almost all relative heat being transferred from the exiting fluid to the incoming fluid. To maintain a constant temperature, a small quantity of extra energy is needed to raise and lower the overall fluid temperature. In the adiabatic wheel heat exchanger, an intermediate liquid is used to store heat, which is then transferred to the opposite side of the heat exchanger. An adiabatic wheel consists of a large wheel with threads that rotate through the liquids—both hot and cold—to extract or transfer heat. The heat exchangers described in this disclosure can include any one of the heat exchangers described earlier, other heat exchangers, or combinations of them.

Each heat exchanger in each configuration can be associated with a respective thermal duty (or heat duty). The thermal duty of a heat exchanger can be defined as an amount of heat that can be transferred by the heat exchanger from the hot stream to the cold stream. The amount of heat can be calculated from the conditions and thermal properties of both the hot and cold streams. From the hot stream point of view, the thermal duty of the heat exchanger is the product of the hot stream flow rate, the hot stream specific heat, and a difference in temperature between the hot stream inlet temperature to the heat exchanger and the hot stream outlet temperature from the heat exchanger. From the cold stream point of view, the thermal duty of the heat exchanger is the product of the cold stream flow rate, the cold stream specific heat and a difference in temperature between the cold stream outlet from the heat exchanger and the cold stream inlet temperature from the heat exchanger. In several applications, the two quantities can be considered equal assuming no heat loss to the environment for these units, particularly, where the units are well insulated. The thermal duty of a heat exchanger can be measured in watts (W), megawatts (MW), millions of British Thermal Units per hour (Btu/hr.), or millions of kilocalories per hour (Kcal/h). In the configurations described here, the thermal duties of the heat exchangers are provided as being "about X MW," where "X" represents a numerical thermal duty value. The numerical thermal duty value is not absolute. That is, the actual thermal duty of a heat exchanger can be approximately equal to X, greater than X or less than X.

Flow Control System

In each of the configurations described later, process streams (also called "streams") are flowed within each plant in a NGL fractionation plant and between plants in the NGL fractionation plant. The process streams can be flowed using one or more flow control systems implemented throughout the NGL fractionation plant. A flow control system can include one or more flow pumps to pump the process streams, one or more flow pipes through which the process streams are flowed and one or more valves to regulate the flow of streams through the pipes.

In some implementations, a flow control system can be operated manually. For example, an operator can set a flow rate for each pump and set valve open or close positions to regulate the flow of the process streams through the pipes in the flow control system. Once the operator has set the flow rates and the valve open or close positions for all flow control systems distributed across the NGL fractionation plant, the flow control system can flow the streams within a plant or between plants under constant flow conditions, for example, constant volumetric rate or such flow conditions. To change the flow conditions, the operator can manually operate the flow control system, for example, by changing the pump flow rate or the valve open or close position.

In some implementations, a flow control system can be operated automatically. For example, the flow control system can be connected to a computer system to operate the flow control system. The computer system can include a computer-readable medium storing instructions (such as flow control instructions and other instructions) executable by one or more processors to perform operations (such as flow control operations). An operator can set the flow rates and the valve open or close positions for all flow control systems distributed across the NGL fractionation plant using the computer system. In such implementations, the operator can manually change the flow conditions by providing inputs through the computer system. Also, in such implementations, the computer system can automatically (that is, without manual intervention) control one or more of the flow control systems, for example, using feedback systems implemented in one or more plants and connected to the computer system. For example, a sensor (such as a pressure sensor, temperature sensor or other sensor) can be connected to a pipe through which a process stream flows. The sensor can monitor and provide a flow condition (such as a pressure, temperature, or other flow condition) of the process stream to the computer system. In response to the flow condition exceeding a threshold (such as a threshold pressure value, a threshold temperature value, or other threshold value), the computer system can automatically perform operations. For example, if the pressure or temperature in the pipe exceeds the threshold pressure value or the threshold temperature value, respectively, the computer system can provide a signal to the pump to decrease a flow rate, a signal to open a valve to relieve the pressure, a signal to shut down process stream flow, or other signals.

Figure 1B:
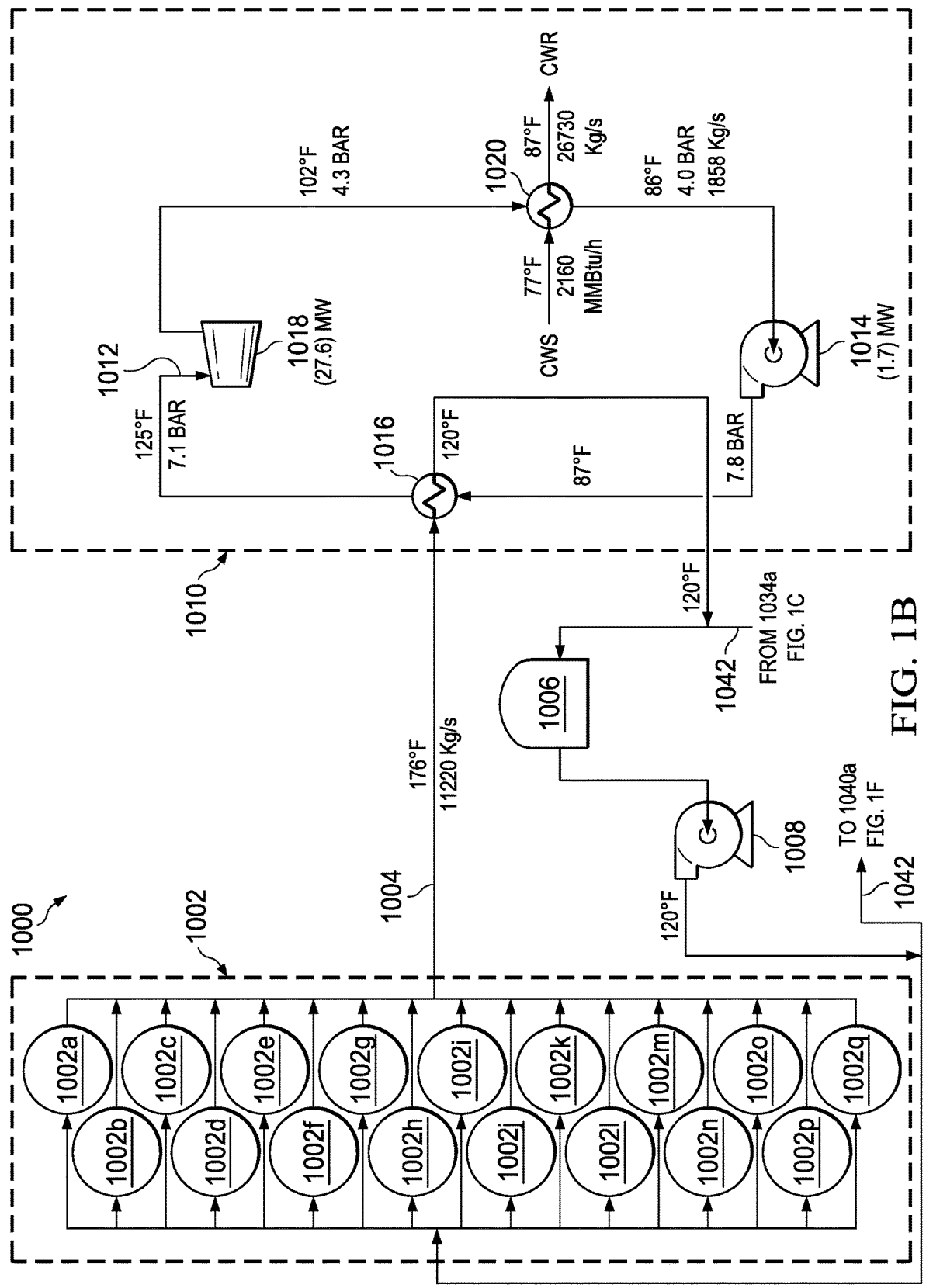
FIG. 1B is a schematic diagram of a system to recover waste heat from heat sources in a NGL fractionation plant.
Figure 1C:
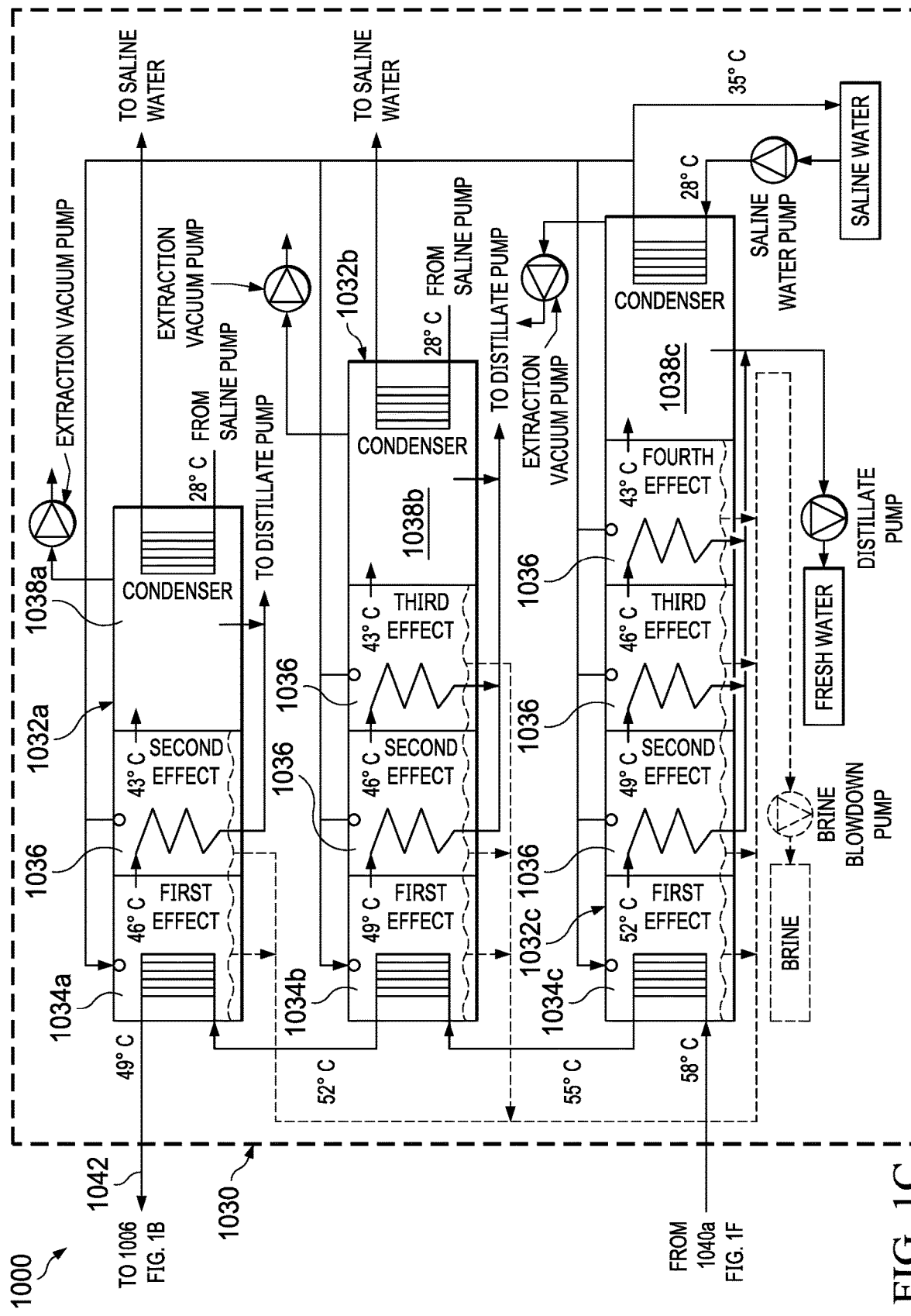
FIG. 1C is a schematic diagram of a multi-effect-distillation (MED) system to recover potable water that is thermally coupled to the system to recover waste heat from heat sources in a NGL fractionation plant.
Figure 1D:
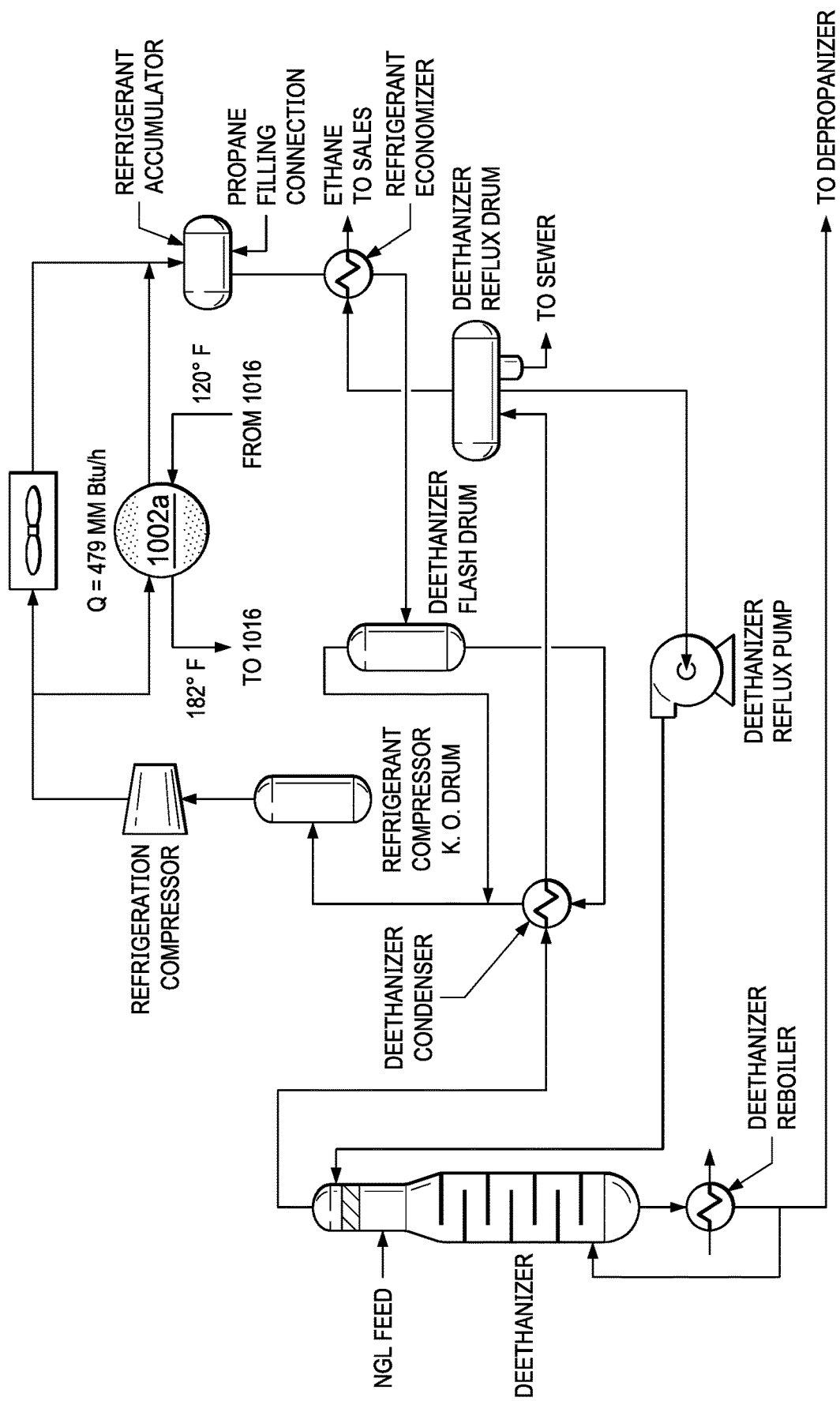
FIG. 1D is a diagram of a heat exchanger in a deethanizer section of a NGL fractionation plant.
Figure 1E:
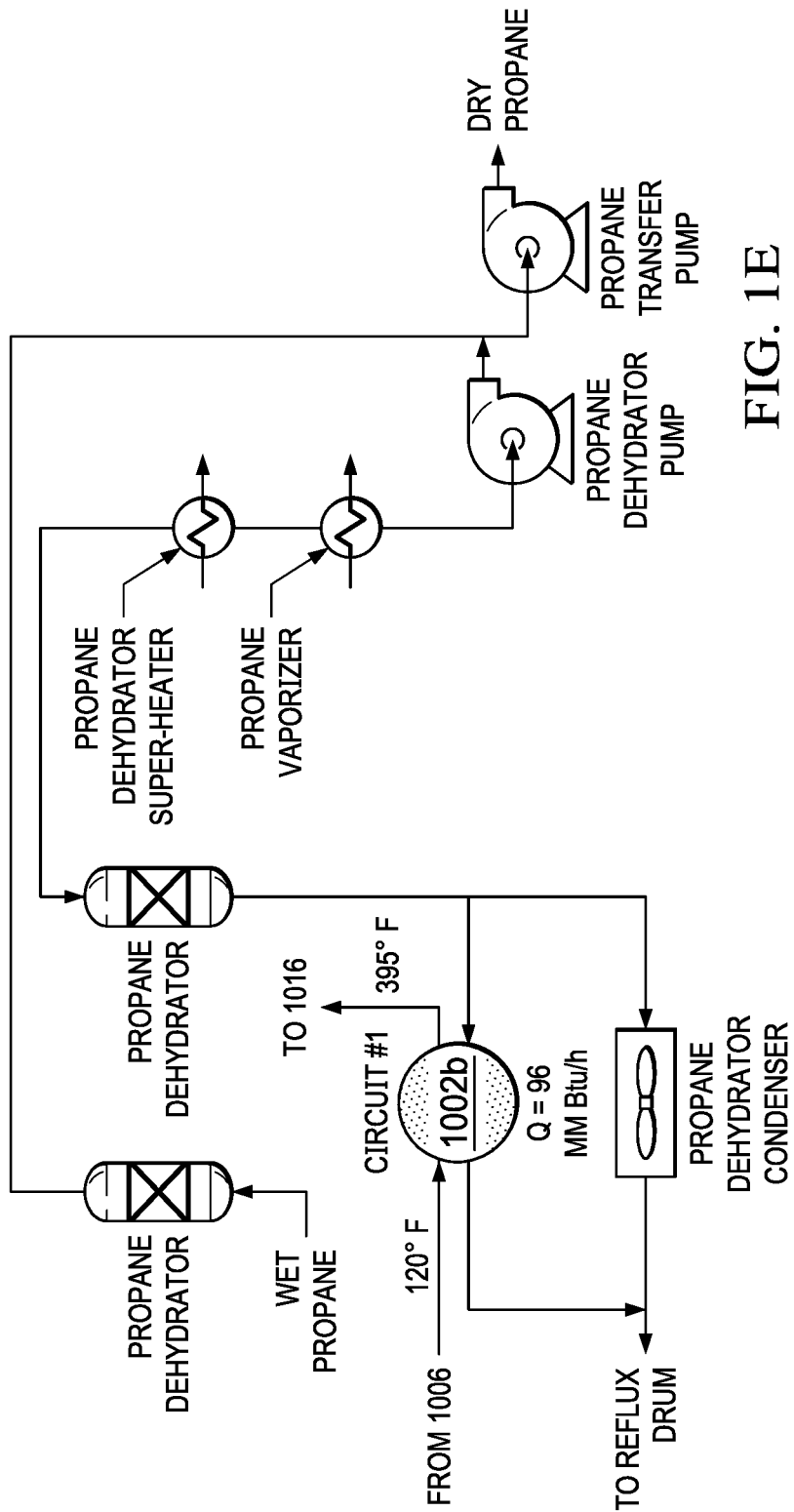
FIG. 1E is a diagram of a heat exchanger in a propane dehydrator section of a NGL fractionation plant.
Figure 1F:
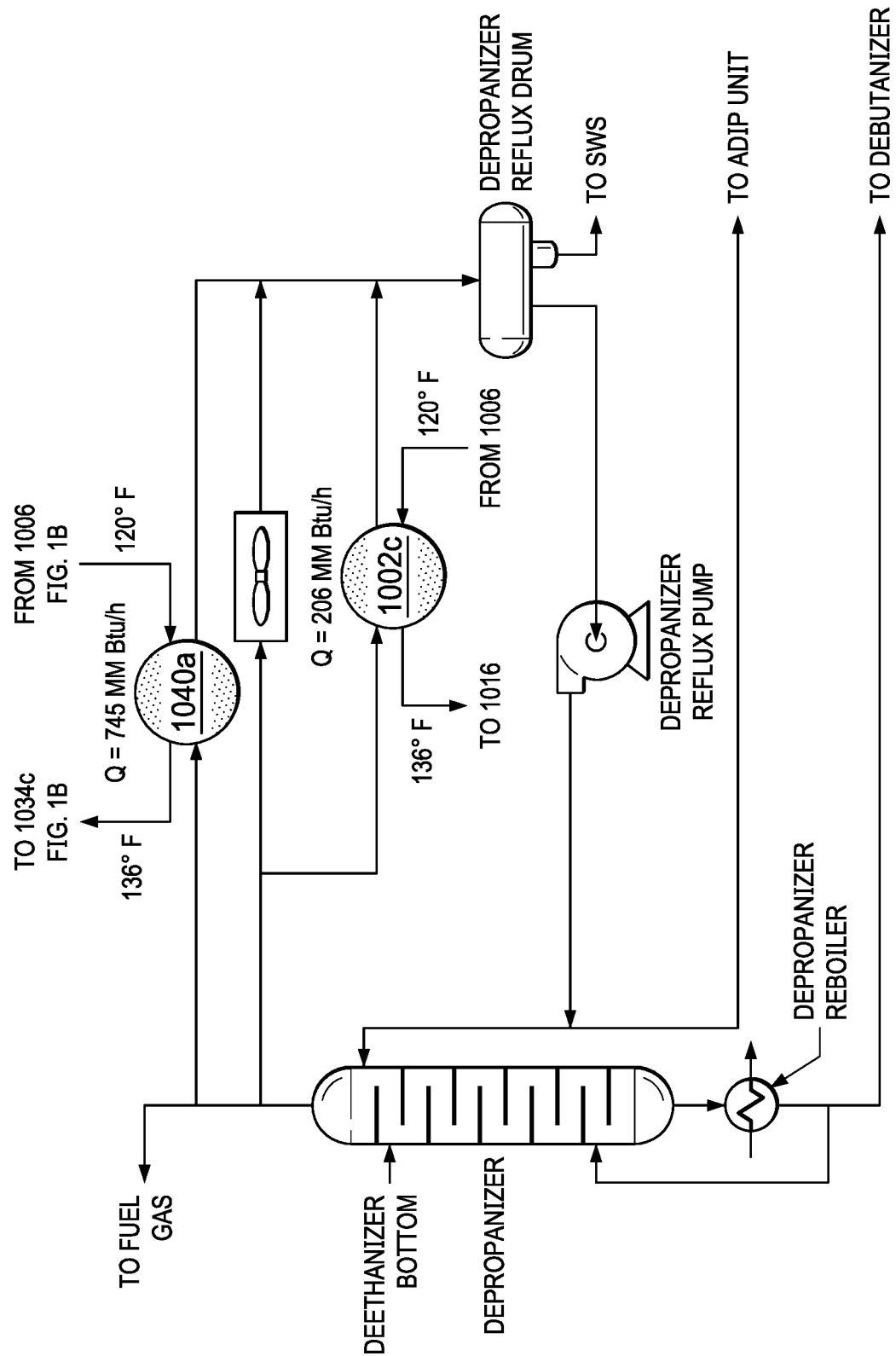
FIG. 1F is a diagram of heat exchangers in a depropanizer section of a NGL fractionation plant.
Figure 1G:
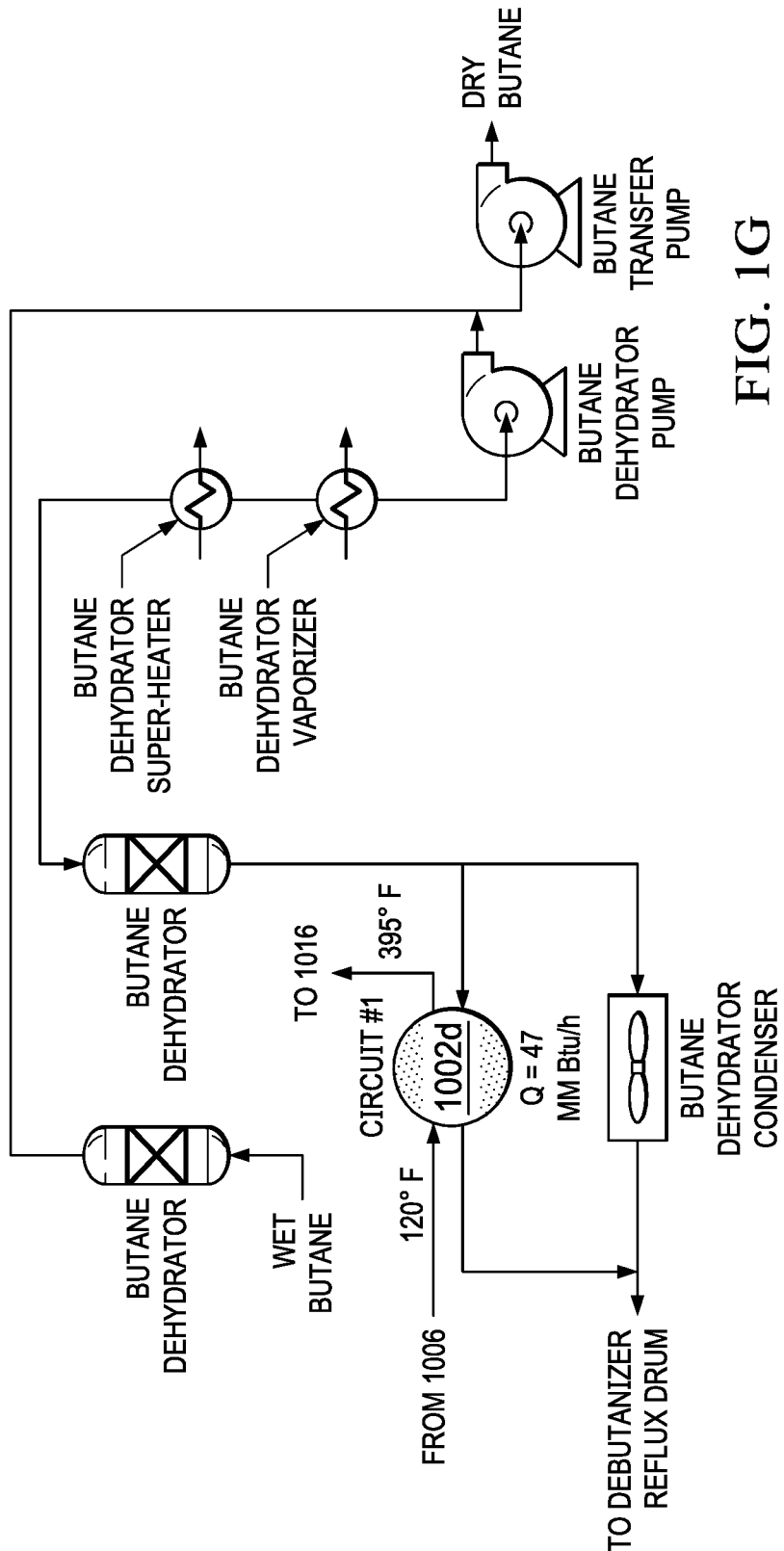
FIG. 1G is a diagram of a heat exchanger in a butane dehydrator section of a NGL fractionation plant.
Figure 1H:
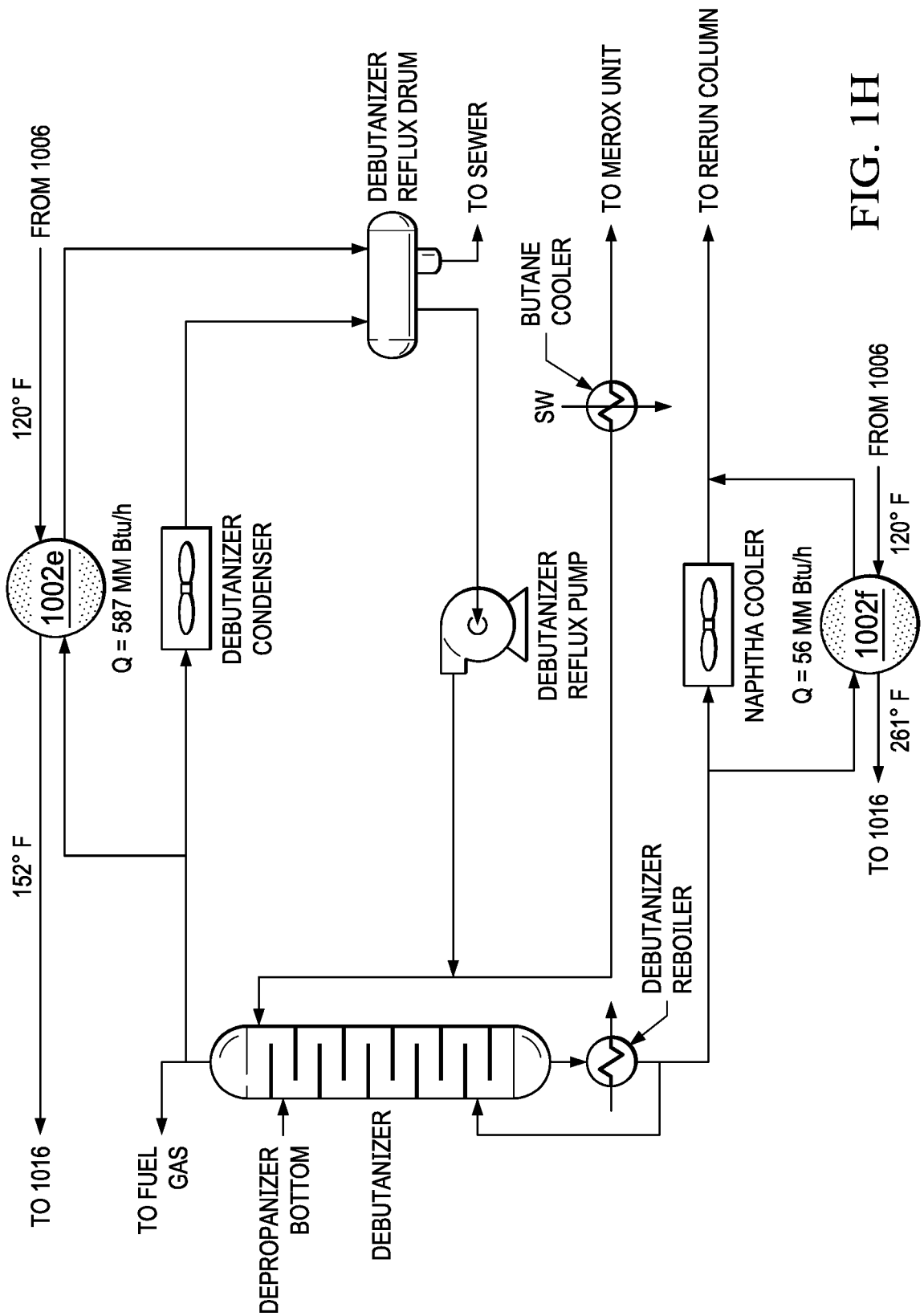
FIG. 1H is a diagram of heat exchangers in a debutanizer section of a NGL fractionation plant.
Figure 1I:
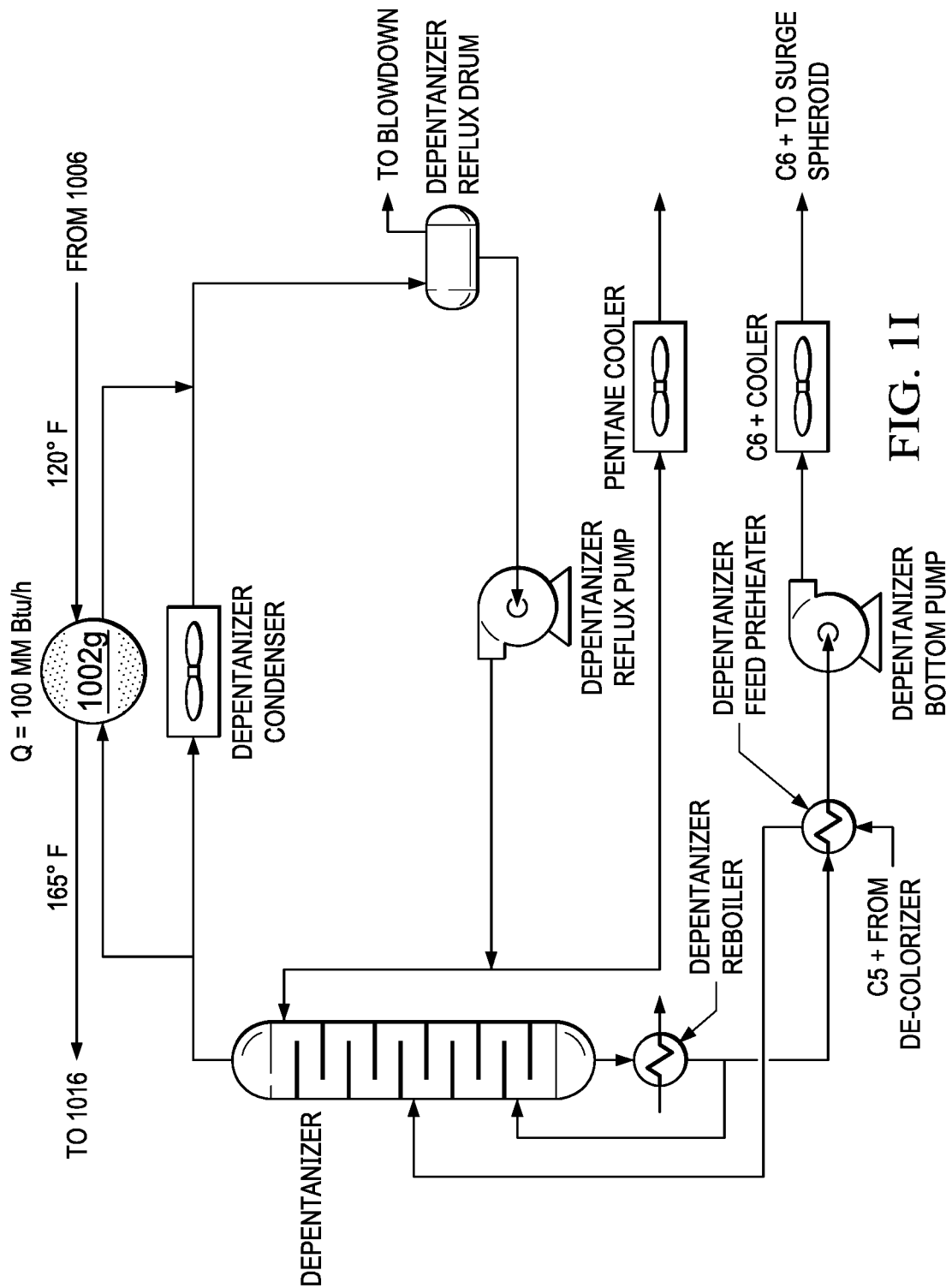
FIG. 1I is a diagram of a heat exchanger in a depentanizer section of a NGL fractionation plant.
Figure 1J:
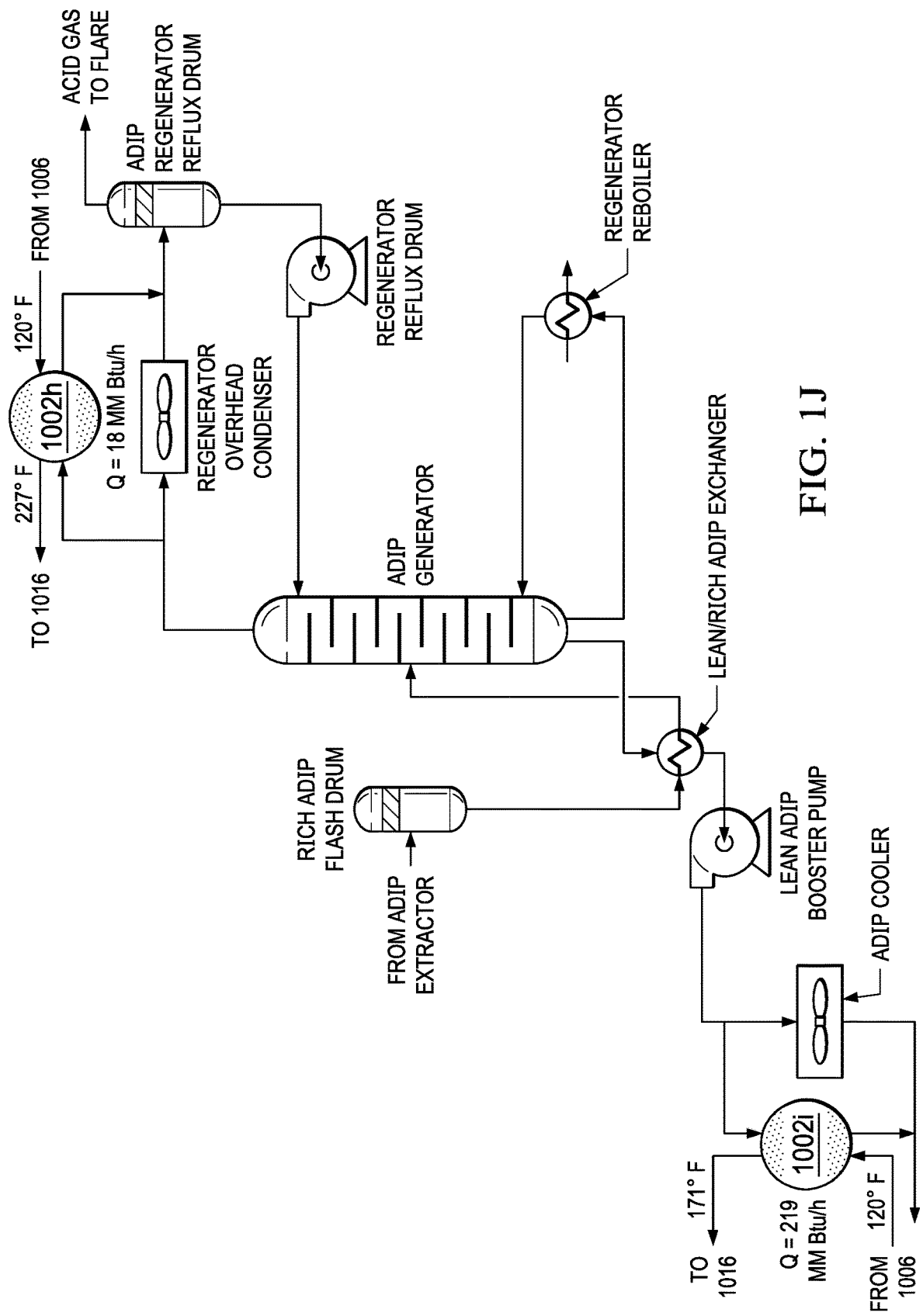
FIG. 1J is a diagram of a heat exchangers in a solvent regeneration section of a NGL fractionation plant.
Figure 1K:
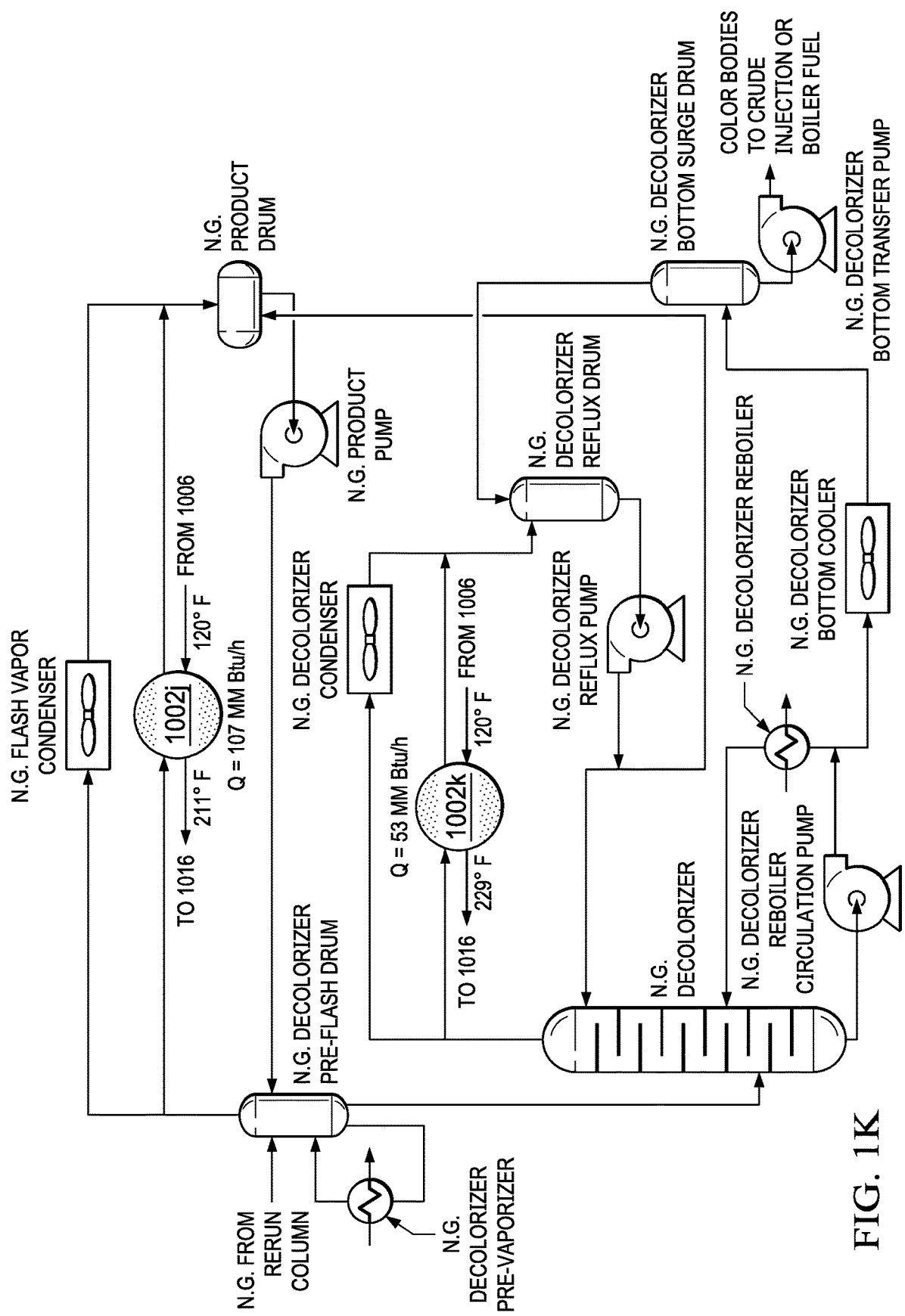
FIG. 1K is a diagram of heat exchangers in a natural gasoline decolorizing section of a NGL fractionation plant.
Figure 1L:
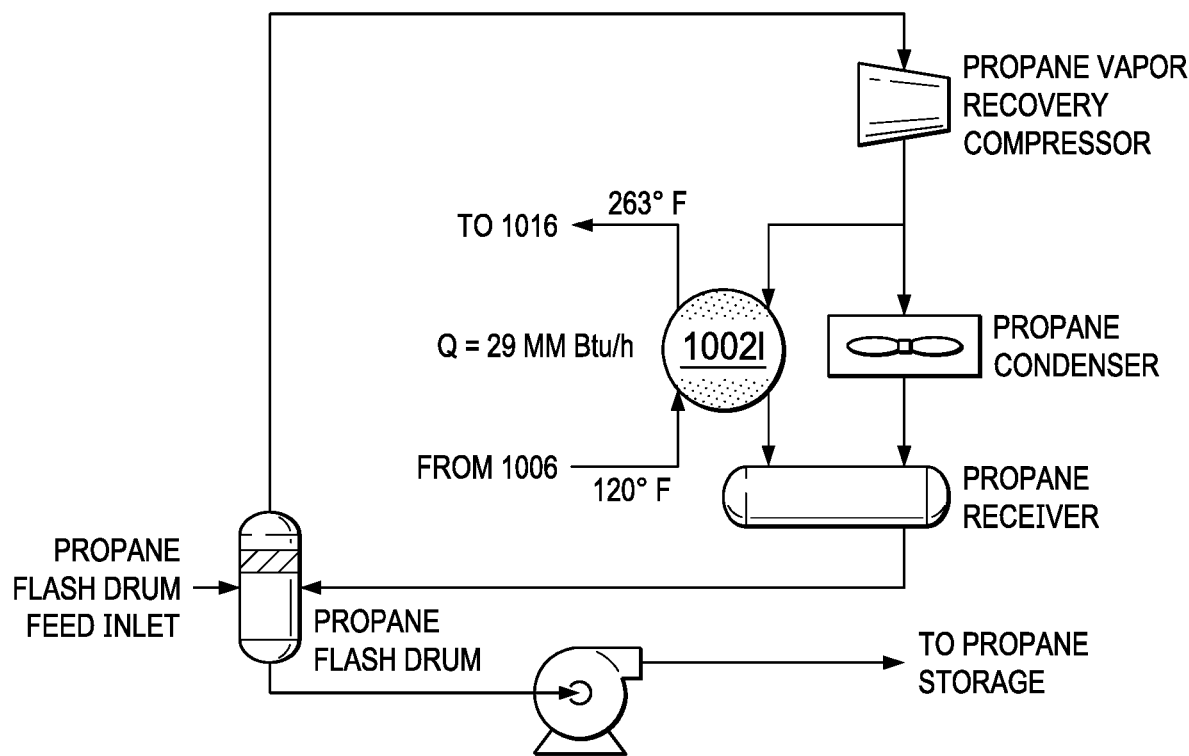
FIG. 1L is a diagram of a heat exchanger in a propane tank recovery section of a NGL fractionation plant.
Figure 1M:
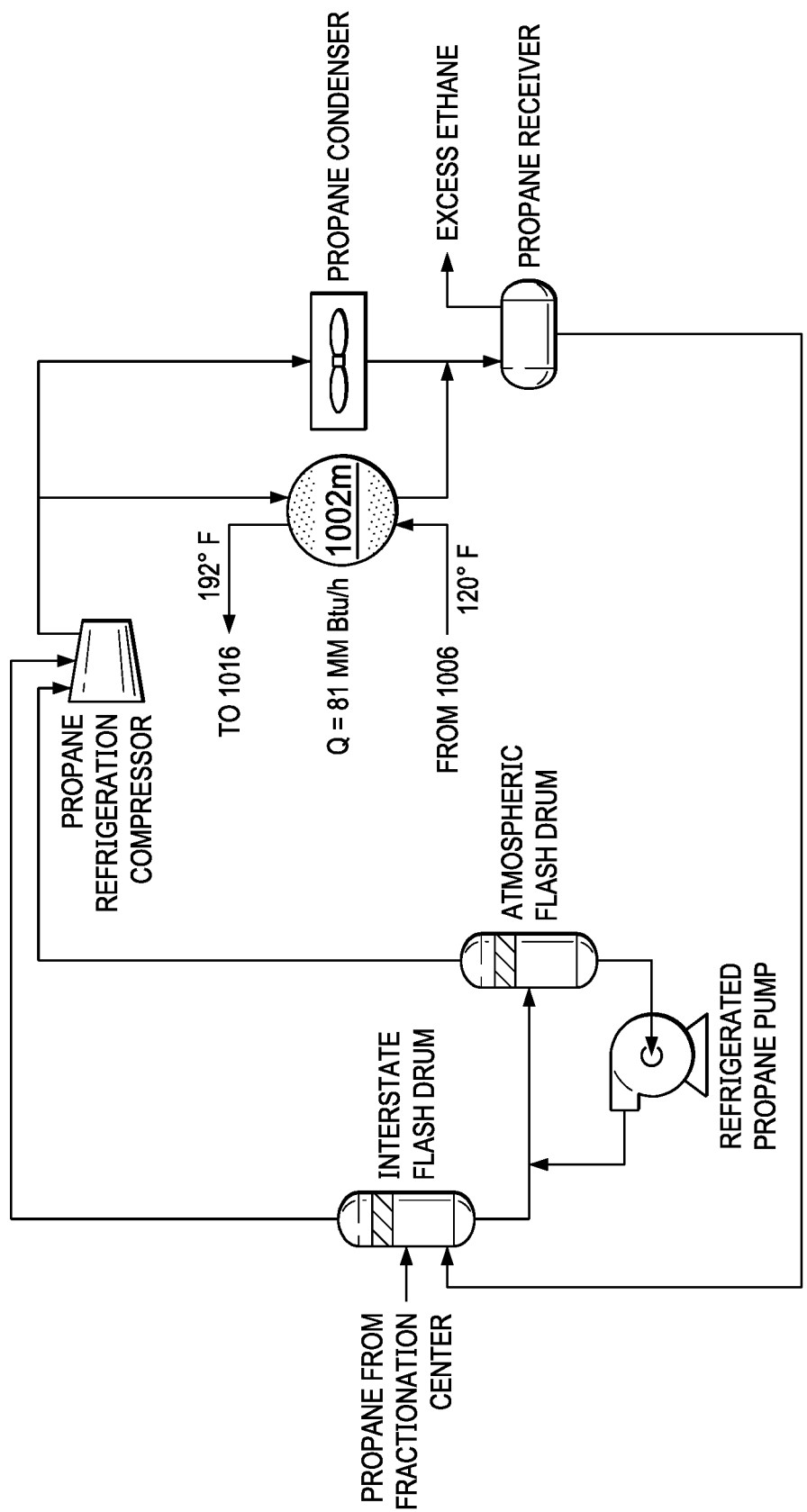
FIG. 1M is a diagram of a heat exchanger in a propane product refrigeration section of a NGL fractionation plant.
Figure 1N:
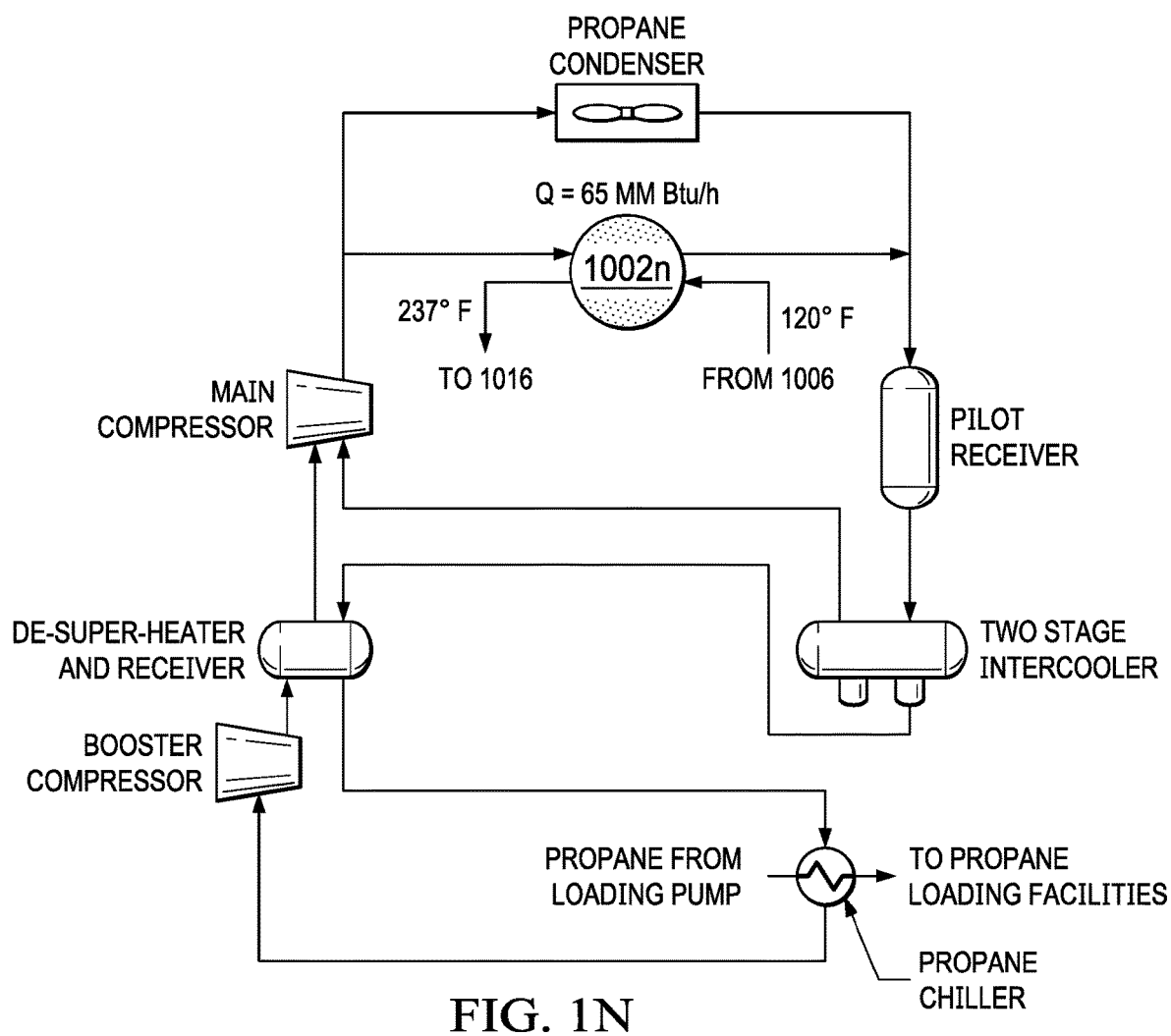
FIG. 1N is a diagram of a heat exchanger in a propane product sub-cooling section of a NGL fractionation plant.
Figure 1O:
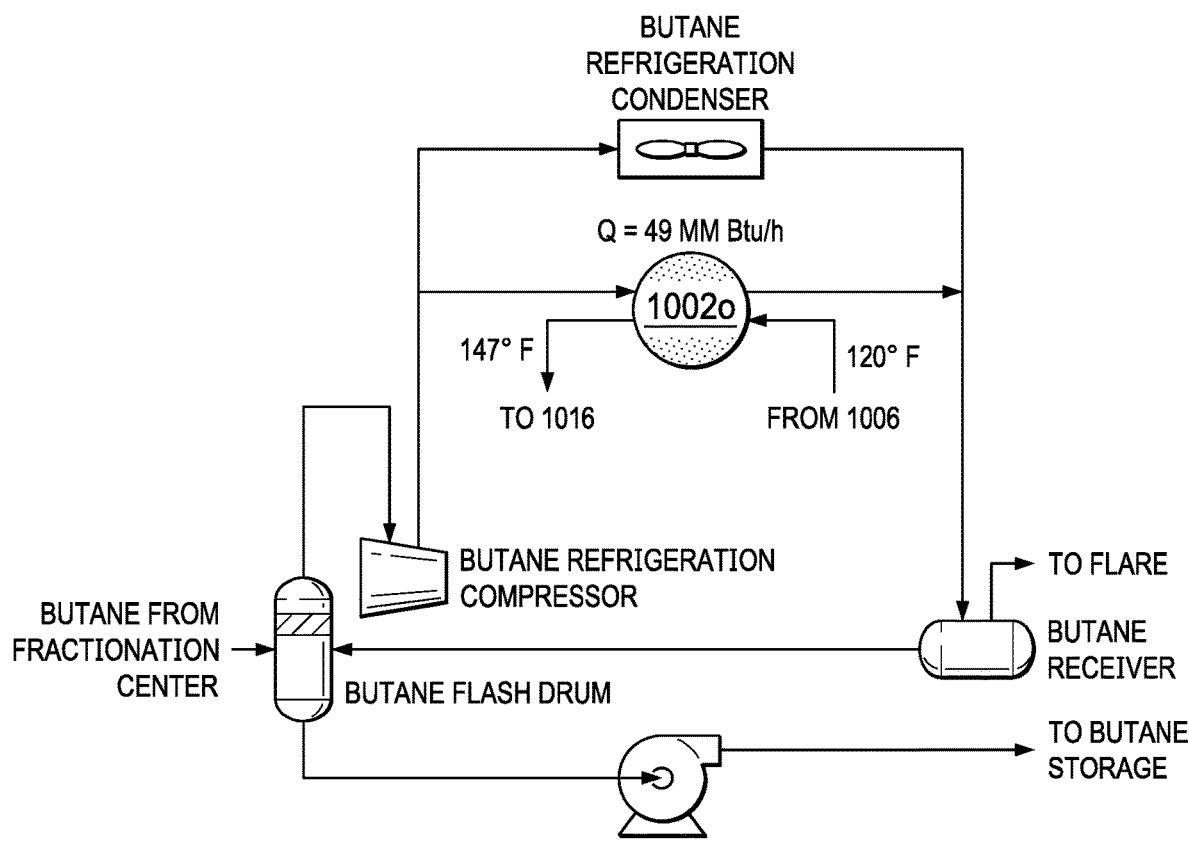
FIG. 1O is a diagram of a heat exchanger in a butane product refrigeration section of a NGL fractionation plant.
Figure 1P:
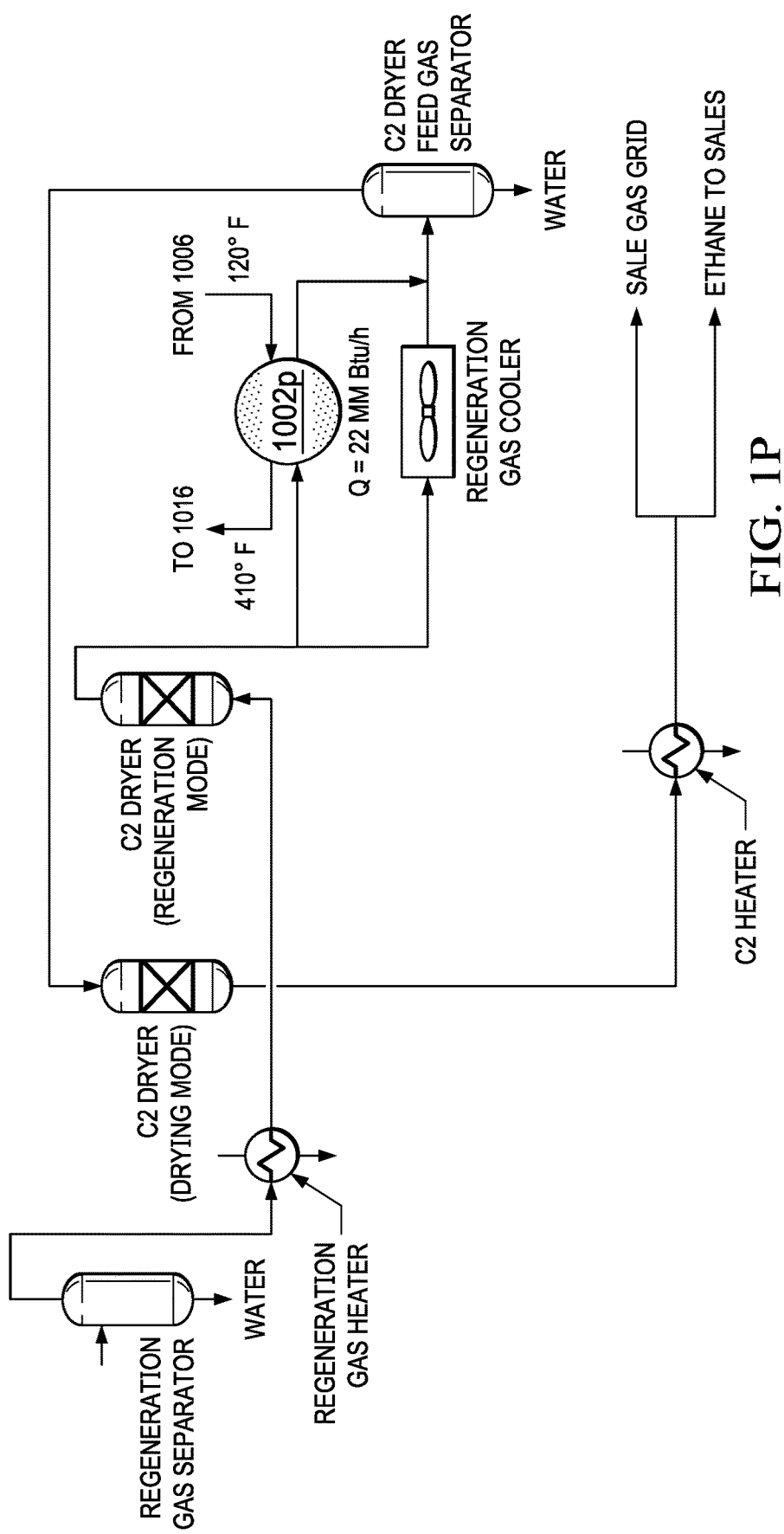
FIG. 1P is a diagram of a heat exchanger in an ethane production section of a NGL fractionation plant.
Figure 1Q:
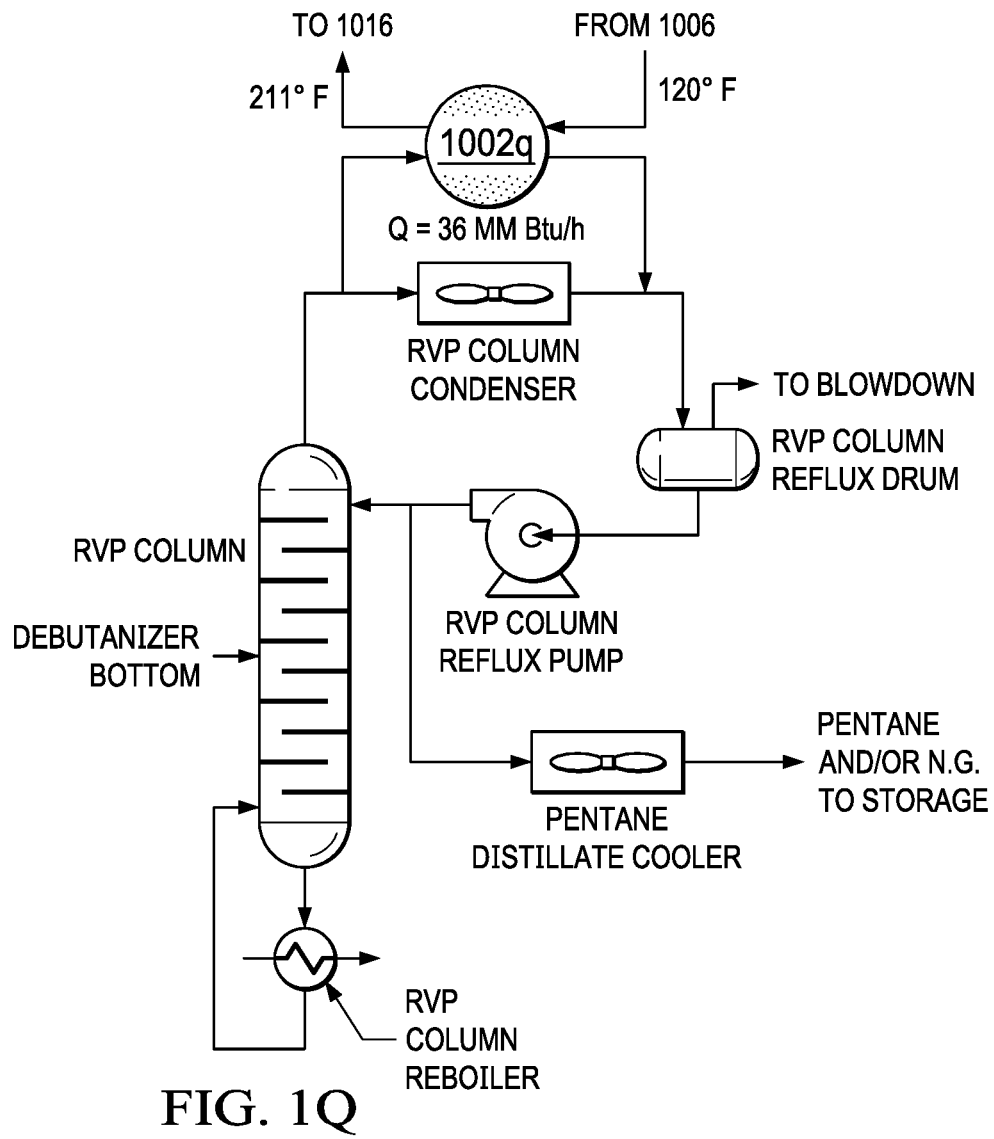
FIG. 1Q is a diagram of a heat exchanger in a natural gasoline vapor section of a NGL fractionation plant.

FIGS. 1A-1Q are schematic illustrations of a power generation and multi-effect distillation (MED) system that utilizes waste heat from one or more heat sources in a natural gas liquid (NGL) fractionation plant.

FIGS. 1A-1C are schematic diagrams of an example system 1000 to recover waste heat from heat sources in an NGL fractionation plant with a power generation system 1010 and a potable water conversion multi-effect-distillation (MED) system 1030. FIGS. 1D-1Q are schematic diagrams illustrating the location of the heat sources within the NGL fractionation plant, as well as the interaction (for example, fluid and thermal) with existing components of the NGL fractionation plant. In this example system 1000, there are eighteen heat sources in the NGL fractionation plant. In this example system 1000, the eighteen heat sources in the NGL fractionation plant are divided into two heating fluid circuits that, in some portions of the two circuits, are separated, and in other portions of the two circuits are combined. In this example system 1000, one of the two heating fluid circuits, which includes seventeen of the eighteen heat exchangers, serves the power generation system 1010 and another of the two heating fluid circuits, which includes one of the eighteen heat exchangers, serves the MED system 1030. The two heating fluid circuits in system 1000 operate in parallel relative to a flow of a buffer fluid in the system 1000.

FIG. 1A is a schematic diagram of an example of a low grade waste heat recovery system. The schematic includes a storage tank 1006 to store buffer fluid, for example, oil, pressurized water, or such buffer fluid. The buffer fluid from the storage tank 1006 is flowed to a heat exchanger network 1002 which, in some implementations, can include the seventeen heat exchangers (for example, heat exchangers 1002a, 1002b, 1002c, 1002d, 1002e, 1002f, 1002g, 1002h, 1002i, 1002j, 1002k, 1002l, 1002m, 1002n, 1002o, 1002p, and 1002q), which are described in detail later. The buffer fluid from the storage tank 1006 is also flowed to a heat exchanger 1040a, which is described in detail later. The buffer fluid is flowed through the heat exchanger network 1002 and heat exchanger 1040a and heated by streams in the NGL fractionation plant (described later). As described later, the heated buffer fluid from the storage tank 1006 is used to generate power in an organic Rankine cycle system 1010, and also used to generate potable water in a modified MED system 1030. The buffer fluid is then returned to the storage tank. In some implementations, the waste heat recovery system can be implemented to include either only the organic Rankine cycle system 1010 or the modified MED system 1030.

Generally, the NGL fractionation plant contains a large amount of low grade waste heat. This waste heat can be used to produce water, cooling, power, or a combination of two or more. In some aspects, embodiments of the present disclosure include a system (such as system 1000) that recovers the waste heat available in the NGL fractionation plant using a heat recovery network that includes multiple (for example, eighteen in some embodiments) heat exchangers distributed in particular areas of the NGL fractionation plant. In some embodiments, the system 1000 can generate about 28 MW using an organic Rankine cycle (ORC) system and about 23,000 $m^3$/day of potable water from saline or brackish water using a multi-effect-distillation (MED) system. The low grade waste heat is recovered from processing units within the NGL fractionation using, for example, one or more buffer streams such as hot oil or pressurized water.

In example embodiments, the buffer streams flow from a storage tank at between about 115° F. and 125° F., for example, about 120° F., and are directed towards specific units in the NGL fractionation plant to recover particular amounts of thermal energy, as shown in FIGS. 1D-1Q. The thermal energy absorbed from the NGL fractionation plant increases the buffer streams original temperature from between about 115° F. and 125° F., for example, about 120° F. to between about 130° F. and 140° F., for example, about 136° F. in a buffer stream 1042 and from between about 115° F. and 125° F., for example, about 120° F. to between about 170° F. and 180° F., for example, about 176° F. in a buffer stream 1042. The buffer streams at for example, 136° F. and 176° F. are then used as shown in FIGS. 1B and 1C to produce about 23,000 m3/day potable water and about 28 MW, respectively. The buffer streams are reduced in temperature in the respective ORC and MED systems to between about 115° F. and 125° F., for example, about 120° F. and flow back to the storage tank, where they are recombined.

FIGS. 1B-1C illustrate schematic diagrams of the example system 1000 to recover waste heat from the eighteen heat sources in the NGL fractionation plant. In some implementations, the system 1000 can include a first heating fluid circuit 1002 thermally coupled to a portion of the multiple heat sources. For example, the portion of multiple heat sources that are thermally coupled to the first heating fluid circuit 1002 can include seventeen of the eighteen heat exchangers, including a first heat exchanger 1002a, a second heat exchanger 1002b, a third heat exchanger 1002c, a fourth heat exchanger 1002d, a fifth heat exchanger 1002e, a sixth heat exchanger 1002f, a seventh heat exchanger 1002g, an eighth heat exchanger 1002h, a ninth heat exchanger 1002i, a tenth heat exchanger 1002j, an eleventh heat exchanger 1002k, a twelfth heat exchanger 1002l, a thirteenth heat exchanger 1002m, a fourteenth heat exchanger 1002n, a fifteenth heat exchanger 1002o, a sixteenth heat exchanger 1002p, and a seventeenth heat exchanger 1002q. In some implementations, the seventeen heat sources can be connected in parallel. In some implementations, a single heat exchanger shown in a figure may illustrate one or more heat exchangers.

As described earlier, the first heating fluid circuit 1002 is thermally coupled to a portion of the multiple heat sources. In some implementations, the system 1000, as shown in FIG. 1C, can also include a second heating fluid circuit that is thermally coupled to another portion of the multiple heat sources. For example, the portion of multiple heat sources that are thermally coupled to the second heating fluid circuit can include one of the seventeen heat exchangers, including a heat exchanger 1040a. In some implementations, a single heat exchanger shown in a figure may illustrate one or more heat exchangers.

The example system 1000 includes the power generation system 1010 that includes an organic Rankine cycle (ORC). The ORC can include a working fluid 1012 that is thermally coupled to the heating fluid circuit 1002 to heat the working fluid 1012. In some implementations, the working fluid 1012 can be isobutane. The ORC can also include a gas expander 1018 configured to generate electrical power from the heated working fluid 1012. As shown in FIG. 1B, the ORC can additionally include an evaporator 1016, a pump 1014 and a condenser 1020. In some implementations, the working fluid 1012 can be thermally coupled to the heating fluid circuit 1002 in the evaporator 1016.

In operation of the power generation system 1010, a first heating fluid 1004 (for example, water, oil, or other fluid) is circulated through the seventeen heat exchangers of the first heating fluid circuit 1002. An inlet temperature of the first heating fluid 1004 that is circulated into the inlets of each of the seventeen heat sources is the same or substantially the same subject to any temperature variations that may result as the heating fluid 1004 flows through respective inlets. Each heat exchanger heats the heating fluid 1004 to a respective temperature that is greater than the inlet temperature. The heated first heating fluid 1004 from the seventeen heat exchangers are combined and are flowed through the evaporator 1016 of the ORC. Heat from the heated heating fluid 1004 is transferred to the working fluid 1012 of the ORC thereby increasing the working fluid temperature and evaporating the working fluid 1012. The heat exchange with the working fluid 1012 results in a decrease in the temperature of the first heating fluid 1004. The flow of the first heating fluid 1004 is then collected in a heating fluid tank 1006, where it is combined with stored heating fluid and heating fluid returned from the second heating fluid circuit. The pump 1008 restarts the waste heat recovery cycles.

FIG. 1C shows MED system 1030 that, in this example, can operate to produce about 23,000 m³/day of potable water. The system 1030, in this example, includes three trains 1032a, 1032b, and 1032c coupled in series such that a flow of the heating fluid 1042 flows from the third train 1032c, then to the second train 1032b, and then to the first train 1032a. Such trains 1032a-c can be independently implemented and installed in stages/phases. Each train 1032a-c can consist of several modules of the exact same or similar design in parallel, for example, to use standard commercial designs of MED units. For example, each train 1032a-c can consist of multiple effects or "stages" 1036, such as between two and four stages as shown. Each train 1032a-c may include an inlet stage 1034a-c, respectively, and one or more additional stages 1036 as shown. Each inlet stage 1034a-c is fluidly coupled with the heating fluid 1042. Generally, each stage 1036 consists of a heat exchanger in which a feed water (for example, salt, brackish, or sea water) is heated. In each stage 1036, the feed water is heated by steam or hot liquid in tubes. Some of the feed water evaporates into a potable water vapor. The feed water vapor flows into the tubes of the next stage 1036, and condenses into a potable water liquid. As the potable water condenses, it releases its heat of condensation to heat and evaporate more feed water. Thus, each stage 1036 reuses the energy from the previous stage.

In some aspects, the heat exchanger tubes in each stage 1036 can be submerged in the feed water, but alternatively the feed water may be sprayed on the top of a bank of horizontal tubes, and then drips from tube to tube until it is collected at the bottom of the stage 1036 as shown. The thinner the metal in the tubes and the thinner the layers of liquid on either side of the tube walls, the more efficient is the energy transport from stage to stage. Introducing more stages 1036 between the heat source (the heating fluid 1042) and sink (saline water used in the condenser stages 1038a-c) reduces the temperature difference between the stages 1036 and greatly reduces the heat transport per unit surface area of the tubes. The energy supplied is reused more times to evaporate more water, but the process takes more time. The amount of water distilled per stage is directly proportional to the amount of energy transport. If the transport is slowed down, the surface area per stage can be increased by, for example, increasing the number and length of the tubes, at the expense of increased installation cost.

As shown, the third train 1032c includes an inlet heat exchanger 1034c that receives the heating fluid 1042 from the heat exchanger 1040a. The heating fluid 1042 is circulated through the inlet heat exchanger (or inlet stage) 1034c, then to the inlet stage 1034b, then to the inlet stage 1034a, and then back to the heating fluid tank 1006 where it combines with the stored heating fluid and fluid returned from the first heating fluid circuit.

As shown, concentrated salt water (or brine) is collected at the bottom of each stage 1036 and delivered to a brine blowdown pump to be removed. A flow of saline water (acting as a condenser, as explained later) can be sprayed on the tubes in the next stage 1036, since the saline water has a suitable temperature and pressure near or slightly greater than the operating temperature and pressure in the next stage 1036. Some of the saline water will flash into potable steam as it is released into the particular stage 1036. In some aspects, the lowest pressure stages 1036 need relatively more surface area to achieve the same energy transport across the tube walls. The expense of installing this surface area limits the usefulness of using very low pressures and temperatures in the later stages 1036. Gases dissolved in the feed water may contribute to reducing the pressure differentials if they are allowed to accumulate in the stages.

As shown, the first and last stages need external heating and cooling respectively. The heating in the inlet stages 1034a-c comes from the heating fluid 1042. The cooling in the condenser stages 1038a-c comes from a flow of saline water that acts as a condenser water. The amount of heat removed from the condenser stages 1038a-c may equal or nearly equal the amount of heat supplied to the first stages 1034a-c by the heating fluid 1042. In some aspects, for sea water desalination, even the first and warmest stage is typically operated at a temperature less than 70° C., to avoid scale formation.

Condensate (potable or fresh water) from all the tubes in all the stages 1034a-c, 1036, and 1038a-c may be pumped out from the respective pressures of the stages to the ambient pressure. The brine collected at the bottom of the condenser stages 1038a-c may be pumped out since it has substantially lower pressure than the ambient pressure. In some implementations, the heating fluid 1042 enters the inlet stage 1034c at 58° C. and exits the inlet stage 1034a at about 49° C. to fully utilize the available waste heat in water generation. The top brine temperature is about 52° C.

In operation, the MED system 1030 includes a feed water (sea, salt or brackish water) distributed onto the heat exchanger of the first effects 1034a-c in all of the trains 1032a-c. The heating fluid 1042 that flows through the heat exchangers in the first effects 1034a-c and releases its energy to the distributed feed water and evaporates a portion of the feed water. The produced potable vapor then condenses in the heat exchanger of the second effects 1036, releasing its heat of condensation to evaporate more potable water in that effect. The brine from the first effects 1034a-c is then purged. At the second effects 1036, the evaporated potable water goes on to power the third effects 1036 with the resulting brine being drained from the bottom of the effects 1036. This process continues to the last effects 1038a-c within each train 1032a-c, with the corresponding produced potable vapor entering the condenser effects 1038a-c and condensed by the incoming saline water acting as a coolant. Part of the preheated saline water is then sent to the various effects as a feed water. In this example implementation, the saline water temperature is 28° C. and the feed water temperature is about 35° C. The temperature drop from effect to effect in this example is about 3° C. As shown in this implementation of the MED system 1030, the third train 1032c has four effects, the second train 1032b has three effects, and the first train 1032a has two effects. These three trains 1032a-c can be implemented in any plant on phases to satisfy a plant's capital availability. Each train 1032a-c uses the same amount of energy/waste heat with decreasing energy quality such as about 73 MW of waste heat.

In the manner described earlier, the heating fluids 1004 and 1042 can be looped through the eighteen heat exchangers to recover heat that would otherwise go to waste in the NGL fractionation plant, and to use the recovered waste heat to operate the power generation system 1010 and the MED system 1030. By doing so, an amount of energy needed to operate the power generation system 1010 can be decreased while obtaining the same or substantially similar power output from the power generation system 1010. For example, the power output from the power generation system 1010 that implements the waste heat recovery network can be greater than or less than the power output from a power generation system that does not implement the waste heat recovery network. Where the power output is less, the difference may not be statistically significant. Consequently, a power generation efficiency of the NGL fractionation plant can be increased.

FIG. 1B illustrates an example waste heat conversion to power using an ORC. FIG. 1B shows an ORC that uses, for example, isobutane as a working fluid 1012 at about 7.8 bar to recover about 2250 MM BTU/h of waste heat from a heating fluid 1004 (for example, hot oil or water) that collects this thermal energy from specific units in the NGL fractionation plant. The heating fluid 1004 stream at a temperature of between about 170° F. and 180° F., for example, about 176° F. is used to preheat and vaporize the working fluid 1012 at between about 80° F. and 90° F., for example, about 87° F., and then the vaporized working fluid 1012 flows to the gas expander 1018 to generate about 27.6 MW of power. The working fluid 1012, as a superheated vapor, leaves the gas expander 1018 and is then condensed using condenser 1020 with a condenser liquid (for example, water) feed temperature at between about 70° F. and 80° F., for example, about 77° F. The condensed working fluid 1012 is then pumped back to the cycle operating pressure and to the heating fluid tank 1006, and the cycle continues as shown in FIG. 1B.

As shown, the heating fluids 1004 and 1042 are pumped, at between about 115° F. and 125° F., for example, about 120° F., from the tank 1006 by the pump 1008. The heating fluid from tank 1006 is divided and directed towards specific units in the NGL fractionation plant to recover specific amounts of thermal energy. The thermal energy absorbed from the NGL fractionation plant increases the heating fluid 1042 from between about 115° F. and 125° F., for example, about 120° F. to between about 130° F. and 140° F., for example, about 136° F. The heating fluid 1042 at, for example, 136° F. is then used to drive the MED system 130, as previously described, to produce desalinated water from a saline feed water (for example, a brackish water stream or sea water stream) at the rate of about 23,000 m³/day. The temperature of the heating fluid 1042 is reduced in the MED system 1030 to its original value of 120° F. and this stream flows back to tank 1006.

The thermal energy absorbed from the NGL fractionation plant also increases the temperature of the heating fluid 1004 from between about 115° F. and 125° F., for example, about 120° F. to between about 170° F. and 180° F., for example, about 176° F. The heating fluid 1004 stream at 136° F. is then used to drive the power generation system 1010 to produce about 28 MW of power. The temperature of the heating fluid 1004 is reduced in the power generation system 1010 to its original value of 120° F. and this stream flows back to the tank 1006.

FIG. 1D shows the first heat exchanger 1002a in a deethanizer section of the NGL fractionation plant. In this example, the heat exchanger 1002a is positioned and thermally coupled to a heat source to recover waste heat from the refrigeration compressor(s) of the deethanizer reflux generation unit(s). The heating fluid 1004 is circulated from the tank 1006 at 120° F. to heat exchanger 1002a to cool down the outlet stream of the deethanizer refrigeration compressor. The heating fluid 1004 is heated in the heat exchanger 1002a to between about 175° F. and 185° F., for example, about 182° F. before it flows to a collection header to join other heating fluid streams 1004 from other parts of the NGL fractionation plant to flow to the evaporator 1016 of the power generation system 1010. The total thermal duty of the heat exchanger 1002a is about 479 MM BTU/H.

FIG. 1E shows the second heat exchanger 1002b in a propane dehydrator section of the NGL fractionation plant.

In this example, the heat exchanger 1002b is positioned and thermally coupled to a heat source to recover waste heat from the propane dehydration section. The heating fluid 1004 is circulated from the storage tank 1006 at 120° F. to heat exchanger 1002b to cool down the outlet stream of the propane dehydrator. The heating fluid 1004 is heated in the heat exchanger 1002b to between about 390° F. and 400° F., for example, about 395° F. before it is circulated to the collection header to join other heating fluid streams 1004 from other parts of the NGL fractionation plant to flow to the evaporator 1016 of the power generation system 1010. The total thermal duty of the heat exchanger 1002b is about 96 MM BTU/H.

FIG. 1F shows the eighteenth heat exchanger 1040a and the third heat exchanger 1002c in a depropanizer section of the NGL fractionation plant. In this example, the heat exchangers 1040a and 1002c are positioned and thermally coupled to respective heat sources to recover waste heat from the depropanizer section. The heating fluid 1042 is circulated from the storage tank 1006 at 120° F. to heat exchanger 1040a to cool down the outlet stream of the depropanizer overhead stream. The heating fluid 1042 is heated in the heat exchanger 1040a to between about 130° F. and 140° F., for example, about 136° F. before it is circulated to the first train 1032a of the MED system 1030. The total thermal duty of the heat exchanger 1040a is about 745 MM BTU/H.

The heating fluid 1004 is circulated from the storage tank 1006 at 120° F. to heat exchanger 1002c to cool down the outlet stream of the depropanizer overhead stream. The heating fluid 1004 is heated in the heat exchanger 1002c to between about 130° F. and 140° F., for example, about 136° F. before it is circulated to the collection header to join other heating fluid streams 1004 from other parts of the NGL fractionation plant to flow to the evaporator 1016 of the power generation system 1010. The total thermal duty of the heat exchanger 1002c is about 206 MM BTU/H.

FIG. 1G shows the fourth heat exchanger 1002d in a butane dehydrator section of the NGL fractionation plant. In this example, the heat exchanger 1002d is positioned and thermally coupled to a heat source to recover waste heat from the butane dehydration section. The heating fluid 1004 is circulated from the storage tank 1006 at 120° F. to heat exchanger 1002d to cool down the outlet stream of the butane dehydrator. The heating fluid 1004 is heated in the heat exchanger 1002d to between about 390° F. and 400° F., for example, about 395° F. before it is circulated to the collection header to join other heating fluid streams 1004 from other parts of the NGL fractionation plant to flow to the evaporator 1016 of the power generation system 1010. The total thermal duty of the heat exchanger 1002d is about 47 MM BTU/H.

FIG. 1H shows the fifth heat exchanger 1002e and the sixth heat exchanger 1002f in a debutanizer section of the NGL fractionation plant. In this example, the heat exchangers 1002e and 1002f are positioned and thermally coupled to respective heat sources to recover waste heat from the debutanizer section. The heating fluid 1004 is circulated from the storage tank 1006 at 120° F. to heat exchanger 1002e to cool down the outlet stream of the debutanizer overhead stream. The heating fluid 1004 is heated in the heat exchanger 1002e to between about 145° F. and 155° F., for example, about 152° F. before it is circulated to the collection header to join other heating fluid streams 1004 from other parts of the NGL fractionation plant then directed to flow to the evaporator 1016 of the power generation system 1010. The total thermal duty of the heat exchanger 1002e is about 587 MM BTU/H.

The heating fluid 1004 is circulated from the storage tank 1006 at 120° F. to heat exchanger 1002f to cool down the outlet stream of the debutanizer bottoms. The heating fluid 1004 is heated in the heat exchanger 1002f to between about 255° F. and 265° F., for example, about 261° F. before it is circulated to the collection header to join the other heating fluid streams 1004 from other parts of the NGL fractionation plant then directed to flow to the evaporator 1016 of the power generation system 1010. The total thermal duty of the heat exchanger 1002f is about 56 MM BTU/H.

FIG. 1I shows the seventh heat exchanger 1002g in a depentanizer section of the NGL fractionation plant. In this example, the heat exchanger 1002g is positioned and thermally coupled to a heat source to recover waste heat from the depentanizer section. The heating fluid 1004 is circulated from the storage tank 1006 at 120° F. to heat exchanger 1002g to cool down the outlet stream of the depentanizer overhead stream. The heating fluid 1004 is heated in the heat exchanger 1002g to between about 160° F. and 170° F., for example, about 165° F. before it is circulated to the collection header to join other heating fluid streams 1004 from other parts of the NGL fractionation plant then directed to flow to the evaporator 1016 of the power generation system 1010. The total thermal duty of the heat exchanger 1002g is about 100 MM BTU/H.

FIG. 1J shows the eighth heat exchanger 1002h and the ninth heat exchanger 1002i in a solvent regeneration section of the NGL fractionation plant. In this example, the heat exchangers 1002h and 1002i are positioned and thermally coupled to respective heat sources to recover waste heat from the ADIP regeneration section. The heating fluid 1004 is circulated from the storage tank 1006 at 120° F. to heat exchanger 1002h to cool down the outlet stream of the ADIP regeneration section overhead stream. The heating fluid 1004 is heated in the heat exchanger 1002h to between about 225° F. and 235° F., for example, about 227° F. before it is circulated to the collection header to join other heating fluid streams 1004 from other parts of the NGL fractionation plant then directed to flow to the evaporator 1016 of the power generation system 1010. The total thermal duty of the heat exchanger 1002h is about 18 MM BTU/H.

Another branch of the heating fluid 1004 is circulated from the storage tank 1006 at 120° F., to heat exchanger 1002i to cool down the outlet stream of the ADIP regeneration section bottoms. The heating fluid 1004 is heated in the heat exchanger 1002i to between about 165° F. and 175° F., for example, about 171° F. before it is circulated to the collection header to join the other heating fluid streams 1004 from other parts of the NGL fractionation plant then directed to flow to the evaporator 1016 of the power generation system 1010. The total thermal duty of the heat exchanger 1002i is about 219 MM BTU/H.

FIG. 1K shows the tenth heat exchanger 1002j and the eleventh heat exchanger 1002k in a natural gasoline decolorizing section of the NGL fractionation plant. In this example, the heat exchangers 1002j and 1002k are positioned and thermally coupled to respective heat sources to recover waste heat from the natural gasoline decolorizing section. The heating fluid 1004 is circulated from the storage tank 1006 at 120° F. to heat exchanger 1002j to cool down the outlet stream of the natural gasoline decolorizing pre-flash drum overhead stream. The heating fluid 1004 is heated in the heat exchanger 1002j to between about 205° F. and 215° F., for example, about 211° F. before it is circulated to the collection header to join other heating fluid streams 1004 from other parts of the NGL fractionation plant then directed to flow to the evaporator 1016 of the power generation system 1010. The total thermal duty of the heat exchanger 1002j is about 107 MM BTU/H.

The heating fluid 1004 is circulated from the storage tank 1006 at 120° F. to heat exchanger 1002k to cool down the outlet stream of the natural gasoline decolorizer overhead stream. The heating fluid 1004 is heated in the heat exchanger 1002k to between about 225° F. and 235° F., for example, about 229° F. before it is circulated to the collection header to join the other heating fluid streams 1004 from other parts of the NGL fractionation plant then directed to flow to the evaporator 1016 of the power generation system 1010. The total thermal duty of the heat exchanger 1002k is about 53 MM BTU/H.

FIG. 1L shows the twelfth heat exchanger 1002l in a propane tank recovery section of the NGL fractionation plant. In this example, the heat exchanger 1002l is positioned and thermally coupled to a heat source to recover waste heat from the propane tank vapor recovery section. The heating fluid 1004 is circulated from the storage tank 1006 at 120° F. to heat exchanger 1002l to cool down the outlet stream of the propane vapor recovery compressor stream. The heating fluid 1004 is heated in the heat exchanger 1002l to between about 260° F. and 270° F., for example, about 263° F. before it is circulated to the collection header to join other heating fluid streams 1004 from other parts of the NGL fractionation plant then directed to flow to the evaporator 1016 of the power generation system 1010. The total thermal duty of the heat exchanger 1002l is about 29 MM BTU/H.

FIG. 1M shows the thirteenth heat exchanger 1002m in a propane product refrigeration section of the NGL fractionation plant. In this example, the heat exchanger 1002m is positioned and thermally coupled to a heat source to recover waste heat from the propane product refrigeration section. The heating fluid 1004 is circulated from the storage tank 1006 at 120° F. to heat exchanger 1002m to cool down the outlet stream of the propane refrigeration compressor stream. The heating fluid 1004 is heated in the heat exchanger 1002m to between about 185° F. and 195° F., for example, about 192° F. before it is circulated to the collection header to join other heating fluid streams 1004 from other parts of the NGL fractionation plant then directed to flow to the evaporator 1016 of the power generation system 1010. The total thermal duty of the heat exchanger 1002m is about 81 MM BTU/H.

FIG. 1N shows the fourteenth heat exchanger 1002n in a propane product sub-cooling section of the NGL fractionation plant. In this example, the heat exchanger 1002n is positioned and thermally coupled to a heat source to recover waste heat from the propane product sub-cooling section. The heating fluid 1004 is circulated from the storage tank 1006 at 120° F. to heat exchanger 1002n to cool down the outlet stream of the propane main compressor stream. The heating fluid 1004 is heated to between about 235° F. and 245° F., for example, about 237° F. before it is circulated to the collection header to join other heating fluid streams 1004 from other parts of the NGL fractionation plant then directed to flow to the evaporator 1016 of the power generation system 1010. The total thermal duty of the heat exchanger 1002n is about 65 MM BTU/H.

FIG. 1O shows the fifteenth heat exchanger 1002o in a butane product refrigeration section of the NGL fractionation plant. In this example, the heat exchanger 1002o is positioned and thermally coupled to a heat source to recover waste heat from the butane product refrigeration section. The heating fluid 1004 is circulated from the storage tank 1006 at 120° F. to heat exchanger 1002o to cool down the outlet stream of the butane refrigeration compressor stream. The heating fluid 1004 is heated in the heat exchanger 1002o to between about 145° F. and 155° F., for example, about 147° F. before it is circulated to the collection header to join other heating fluid streams 1004 from other parts of the NGL fractionation plant then directed to flow to the evaporator 1016 of the power generation system 1010. The total thermal duty of the heat exchanger 1002o is about 49 MM BTU/H.

FIG. 1P shows the sixteenth heat exchanger 1002p in an ethane production section of the NGL fractionation plant. In this example, the heat exchanger 1002p is positioned and thermally coupled to a heat source to recover waste heat from the ethane production section. The heating fluid 1004 is circulated from the storage tank 1006 at 120° F. to heat exchanger 1002p to cool down the outlet stream of the ethane dryer during the generation mode. The heating fluid 1004 is heated in the heat exchanger 1002p to between about 405° F. and 415° F., for example, about 410° F. before it is circulated to the collection header to join other heating fluid streams 1004 from other parts of the NGL fractionation plant then directed to flow to the evaporator 1016 of the power generation system 1010. The total thermal duty of the heat exchanger 1002p is about 22 MM BTU/H.

FIG. 1Q shows the seventeenth heat exchanger 1002q in a natural gasoline vapor section of the NGL fractionation plant. In this example, the heat exchanger 1002q is positioned and thermally coupled to a heat source to recover waste heat from the natural gasoline vapor pressure control section. The heating fluid 1004 is circulated from the storage tank 1006 at 120° F. to heat exchanger 1002q to cool down the outlet stream of the Reid vapor pressure control column overhead stream. The heating fluid 1004 is heated in the heat exchanger 1002q to between about 205° F. and 215° F., for example, about 211° F. before it is circulated to the collection header to join other heating fluid streams 1004 from other parts of the NGL fractionation plant then directed to flow to the evaporator 1016 of the power generation system 1010. The total thermal duty of the heat exchanger 1002q is about 36 MM BTU/H.

FIGS. 1A-1Q illustrate schematic views of an example system 1000 for a power conversion and MED network that includes waste heat sources associated with a NGL fractionation plant. In this example system 1000, a mini-power plant synthesis uses an independent heating circuits of power generation system 1010 and MED 1030, sharing hot water (or other heating fluid) and isobutane systems infrastructure, to generate power and distilled fresh water from specific portions of NGL fractionation plant low-low grade waste heat sources. In some aspects, the system 1000 can be implemented in one or more steps, where each phase can be separately implemented without hindering future steps to implement the system 1000. In some aspects, a minimum approach temperature across a heat exchanger used to transfer heat from a heat source to a working fluid (for example, water) can be 3° C. or greater. Higher minimum approach temperatures can be used in the beginning of the phases at the expense of less waste heat recovery and power generation, while reasonable power generation economics of scale designs are still attractive in the level of tens of megawatts of power generation.

In some aspects of system 1000, optimized efficiency is realized upon using a minimum approach temperature recommended for the specific heat source streams used in the system design. In such example situations, optimized power generation and fresh water production can be realized without re-changing the initial topology or the sub-set of low grade waste heat streams selected/utilized from the NGL fractionation plant utilized in an initial phase. System 1000 and its related process scheme can be implemented for safety and operability through an ORC system and MED systems using buffer streams such as hot oil or high pressure hot water systems or a mix of specified connections among buffer systems. The low-low grade waste-heat-to-power-conversion (for example, less than the low grade waste heat temperature defined by U.S. Department of Energy DOE as 232° C.) may be implemented using the ORC systems using isobutane as an organic fluid at specific operating conditions.

The techniques to recover heat energy generated by the NGL fractionation plant described previously can be implemented in at least one or both of two example scenarios. In the first scenario, the techniques can be implemented in an NGL fractionation plant that is to be constructed. For example, a geographic layout to arrange multiple sub-units of an NGL fractionation plant can be identified. The geographic layout can include multiple sub-unit locations at which respective sub-units are to be positioned. Identifying the geographic layout can include actively determining or calculating the location of each sub-unit in the NGL fractionation plant based on particular technical data, for example, a flow of petrochemicals through the sub-units starting from raw natural gas or crude petroleum and resulting in refined natural gas. Identifying the geographic layout can alternatively or in addition include selecting a layout from among multiple previously-generated geographic layouts. A first subset of sub-units of the NGL fractionation plant can be identified. The first subset can include at least two (or more than two) heat-generating sub-units from which heat energy is recoverable to generate electrical power. In the geographic layout, a second subset of the multiple sub-unit locations can be identified. The second subset includes at least one sub-unit location at which the respective sub-units in the second subset are to be positioned.

A power generation system to recover heat energy from the sub-units in the first subset is identified. The power generation system can be substantially similar to the power generation system described earlier. In the geographic layout, a power generation system location can be identified to position the power generation system. At the identified power generation system location, a heat energy recovery efficiency is greater than a heat energy recovery efficiency at other locations in the geographic layout.

An MED system to recover heat energy from the sub-units in the second subset is identified. The MED system can be substantially similar to the MED described earlier. In the geographic layout, an MED location can be identified to position the MED system. At the identified MED location, a heat energy recovery efficiency is greater than a heat energy recovery efficiency at other locations in the geographic layout The NGL fractionation plant planners and constructors can perform modeling or a computer-based simulation experiments, or both, to identify an optimal location for the power generation system to maximize heat energy recovery efficiency, for example, by minimizing heat loss when transmitting recovered heat energy from the at least two heat-generating sub-units to the power generation system. The NGL fractionation plant can be constructed according to the geographic layout by positioning the multiple sub-units at the multiple sub-unit locations, positioning the power generation system at the power generation system location, positioning the MED system at the MED system location, interconnecting the multiple sub-units with each other such that the interconnected multiple sub-units are configured to refine natural gas or crude oil, interconnecting the power generation system with the sub-units in the first subset such that the power generation system is configured to recover heat energy from the sub-units in the first subset and to provide the recovered heat energy to the power generation system, and interconnecting the MED system with the sub-units in the second subset such that the MED system is configured to recover heat energy from the sub-units in the second subset and to provide the recovered heat energy to the MED system. The power generation system is configured to generate power using the recovered heat energy. The MED system is configured to generate fresh water from brackish water using the recovered heat energy.

In the second scenario, the techniques can be implemented in an operational NGL fractionation plant. In other words, the power generation and MED systems described earlier can be retrofitted to an already constructed and operational NGL fractionation plant.

The economics of industrial production, the limitations of global energy supply, and the realities of environmental conservation are concerns for all industries. It is believed that the world's environment has been negatively affected by global warming caused, in part, by the release of GHG into the atmosphere. Implementations of the subject matter described here can alleviate some of these concerns, and, in some cases, prevent certain NGL fractionation plants, which are having difficulty in reducing their GHG emissions, from having to shut down. By implementing the techniques described here, specific portions in an NGL fractionation plant or an NGL fractionation plant, as a whole, can be made more efficient and less polluting by carbon-free power generation from specific portions of low grade waste heat sources.

Thus, particular implementations of the subject matter have been described. Other implementations are within the scope of the claims provided in this document.

What is claimed is:
1. A system, comprising:
a first heating fluid circuit thermally coupled to a first plurality of heat sources of a natural gas liquid (NGL) fractionation plant, the first plurality of heat sources comprising:
a first portion of sub-units of the NGL fractionation plant that comprises an ethane system;
a second plurality of sub-units of the NGL fractionation plant that comprises a propane system;
a third portion of sub-units of the NGL fractionation plant that comprises a butane system;
a fourth portion of sub-units of the NGL fractionation plant that comprises a pentane system;
a fifth portion of sub-units of the NGL fractionation plant that comprises a natural gasoline system; and
a sixth portion of sub-units of the NGL fractionation plant that comprises a solvent regeneration system;
a second heating fluid circuit thermally coupled to at least one second heat source of the NGL fractionation plant;
a power generation system that comprises an organic Rankine cycle (ORC), the ORC comprising (i) a working fluid that is thermally coupled to the first heating fluid circuit in an evaporator of the ORC to heat the working fluid, and (ii) a first expander configured to generate electrical power from the heated working fluid;

a multi-effect-distillation (MED) system that comprises one or more trains thermally coupled to the second heating fluid circuit and configured to produce potable water using at least a portion of heat from the second heating fluid circuit; and a flow control system that comprises a first set of control valves to selectively thermally couple a heating fluid of the first heating fluid circuit to at least a portion of the first plurality of heat sources of the NGL fractionation plant, the flow control system further comprising a second set of control valves to selectively thermally couple a heating fluid of the second heating fluid circuit to the at least one second heat source of the NGL fractionation plant.

2. The system of claim 1, wherein the MED system comprises a plurality of trains thermally coupled to the second heating fluid circuit.

3. The system of claim 2, wherein the plurality of trains comprise three trains, a first train comprising six effects, a second train comprising four effects, and a third train comprising two effects.

4. The system of claim 1, further comprising a heating fluid tank that is fluidly coupled to the evaporator of the ORC.

5. The system of claim 1, wherein the system further comprises one or more conduits containing the working fluid and the working fluid comprises isobutane.

6. The system of claim 1, wherein the first and second heating fluid circuits further comprise one or more pipes containing water or oil.

7. The system of claim 1, further comprising:
a condenser fluidly coupled to the expander and to a condenser fluid source to cool the working fluid; and
a pump to circulate the working fluid through the ORC.

8. The system of claim 1, wherein the first portion of sub-units of the NGL fractionation plant comprises at least two ethane system heat sources, comprising:
a first ethane system heat source that comprises a heat exchanger that is thermally coupled to an outlet stream of a deethanizer refrigeration compressor; and
a second ethane system heat source that comprises a heat exchanger that is thermally coupled to an outlet stream of an ethane dryer.

9. The system of claim 1, wherein the second portion of sub-units of the NGL fractionation plant comprises at least five propane system heat sources, comprising:
a first propane system heat source that comprises a heat exchanger that is thermally coupled to an outlet stream of a propane dehydrator;
a second propane system heat source that comprises a heat exchanger that is thermally coupled to an outlet stream of a depropanizer overhead stream;
a third propane system heat source that comprises a heat exchanger that is thermally coupled to an outlet stream of a propane vapor recovery compressor stream;
a fourth propane system heat source that comprises a heat exchanger that is thermally coupled to an outlet stream of a propane refrigeration compressor stream; and
a fifth propane system heat source that comprises a heat exchanger that is thermally coupled to an outlet stream of a propane main compressor stream.

10. The system of claim 1, wherein the third portion of sub-units of the NGL fractionation plant comprises at least four butane system heat sources, comprising:
a first butane system heat source that comprises a heat exchanger that is thermally coupled to an outlet stream of a butane dehydrator;
a second butane system heat source that comprises a heat exchanger that is thermally coupled to an outlet stream of a debutanizer overhead stream;
a third butane system heat source that comprises a heat exchanger that is thermally coupled to an outlet stream of a debutanizer bottoms; and
a fourth butane system heat source that comprises a heat exchanger that is thermally coupled to an outlet stream of a butane refrigeration compressor stream.

11. The system of claim 1, wherein the fourth portion of sub-units of the NGL fractionation plant comprises at least one pentane system heat source, comprising:
a first pentane system heat source that comprises a heat exchanger that is thermally coupled to an outlet stream of a depentanizer overhead stream.

12. The system of claim 1, wherein the fifth portion of sub-units of the NGL fractionation plant comprises at least three natural gasoline system heat sources, comprising:
a first natural gasoline system heat source that comprises a heat exchanger that is thermally coupled to an outlet stream of a natural gasoline decolorizing section pre-flash drum overhead stream; and
a second natural gasoline system heat source that comprises a heat exchanger that is thermally coupled to an outlet stream of a natural gasoline decolorizer overhead stream; and
a third natural gasoline system heat source that comprises a heat exchanger that is thermally coupled to an outlet stream of a Reid vapor pressure control column overhead stream.

13. The system of claim 1, wherein the sixth portion of sub-units of the NGL fractionation plant comprises at least two solvent regeneration system heat sources, comprising:
a first solvent regeneration system heat source that comprises a heat exchanger that is thermally coupled to an outlet stream of an ADIP regeneration section overhead stream; and
a second solvent regeneration system heat source that comprises a heat exchanger that is thermally coupled to an outlet stream of an ADIP regeneration section bottoms.

14. The system of claim 1, wherein the at least one second heat source comprises at least one propane system heat source that comprises a heat exchanger that is thermally coupled to an outlet stream of a depropanizer overhead stream.

15. A method of recovering heat energy generated by a natural gas liquid (NGL) fractionation plant, the method comprising:
circulating a first heating fluid through a first heating fluid circuit thermally coupled to a first plurality of heat sources of a natural gas liquid (NGL) fractionation plant, the first plurality of heat sources comprising:
a first portion of sub-units of the NGL fractionation plant that comprises an ethane system;
a second plurality of sub-units of the NGL fractionation plant that comprises a propane system;
a third portion of sub-units of the NGL fractionation plant that comprises a butane system;
a fourth portion of sub-units of the NGL fractionation plant that comprises a pentane system;
a fifth portion of sub-units of the NGL fractionation plant that comprises a natural gasoline system; and
a sixth portion of sub-units of the NGL fractionation plant that comprises a solvent regeneration system;

circulating a second heating fluid through a second heating fluid circuit thermally coupled to at least one second heat source of the NGL fractionation plant;

generating electrical power through a power generation system that comprises an organic Rankine cycle (ORC), the ORC comprising (i) a working fluid that is thermally coupled to the first heating fluid circuit in an evaporator of the ORC to heat the working fluid, and (ii) a expander configured to generate the electrical power from the heated working fluid;

producing potable water with a multi-effect-distillation (MED) system that comprises one or more trains thermally coupled to the second heating fluid circuit from heat transferred to the MED system from the second heating fluid circuit;

actuating, with a flow control system, a first set of control valves to selectively thermally couple a heating fluid of the first heating fluid circuit to at least a portion of the first plurality of heat sources of the NGL fractionation plant; and actuating, with the flow control system, a second set of control valves to selectively thermally couple a heating fluid of the second heating fluid circuit to the at least one second heat source of the NGL fractionation plant.

16. The method of claim 15, wherein the MED system comprises a plurality of trains thermally coupled to the second heating fluid circuit.

17. The method of claim 16, wherein the plurality of trains comprise three trains, a first train comprising six effects, a second train comprising four effects, and a third train comprising two effects.

18. The method of claim 15, further comprising a heating fluid tank that is fluidly coupled to the evaporator of the ORC.

19. The method of claim 15, wherein the system further comprises one or more conduits containing the working fluid and the working fluid comprises isobutane.

20. The method of claim 15, wherein the first and second heating fluid circuits further comprise one or more pipes containing water or oil.

21. The method of claim 15, further comprising:
a condenser fluidly coupled to the expander and to a condenser fluid source to cool the working fluid; and
a pump to circulate the working fluid through the ORC.

22. The method of claim 15, wherein the first portion of sub-units of the NGL fractionation plant comprises at least two ethane system heat sources, comprising:
a first ethane system heat source that comprises a heat exchanger that is thermally coupled to an outlet stream of a deethanizer refrigeration compressor; and
a second ethane system heat source that comprises a heat exchanger that is thermally coupled to an outlet stream of an ethane dryer.

23. The method of claim 15, wherein the second portion of sub-units of the NGL fractionation plant comprises at least five propane system heat sources, comprising:
a first propane system heat source that comprises a heat exchanger that is thermally coupled to an outlet stream of a propane dehydrator;
a second propane system heat source that comprises a heat exchanger that is thermally coupled to an outlet stream of a depropanizer overhead stream;
a third propane system heat source that comprises a heat exchanger that is thermally coupled to an outlet stream of a propane vapor recovery compressor stream;
a fourth propane system heat source that comprises a heat exchanger that is thermally coupled to an outlet stream of a propane refrigeration compressor stream; and
a fifth propane system heat source that comprises a heat exchanger that is thermally coupled to an outlet stream of a propane main compressor stream.

24. The method of claim 15, wherein the third portion of sub-units of the NGL fractionation plant comprises at least four butane system heat sources, comprising:
a first butane system heat source that comprises a heat exchanger that is thermally coupled to an outlet stream of a butane dehydrator;
a second butane system heat source that comprises a heat exchanger that is thermally coupled to an outlet stream of a debutanizer overhead stream;
a third butane system heat source that comprises a heat exchanger that is thermally coupled to an outlet stream of a debutanizer bottoms; and
a fourth butane system heat source that comprises a heat exchanger that is thermally coupled to an outlet stream of a butane refrigeration compressor stream.

25. The method of claim 15, wherein the fourth portion of sub-units of the NGL fractionation plant comprises at least one pentane system heat source, comprising:
a first pentane system heat source that comprises a heat exchanger that is thermally coupled to an outlet stream of a depentanizer overhead stream.

26. The method of claim 15, wherein the fifth portion of sub-units of the NGL fractionation plant comprises at least three natural gasoline system heat sources, comprising:
a first natural gasoline system heat source that comprises a heat exchanger that is thermally coupled to an outlet stream of a natural gasoline decolorizing section pre-flash drum overhead stream; and
a second natural gasoline system heat source that comprises a heat exchanger that is thermally coupled to an outlet stream of a natural gasoline decolorizer overhead stream; and
a third natural gasoline system heat source that comprises a heat exchanger that is thermally coupled to an outlet stream of a Reid vapor pressure control column overhead stream.

27. The method of claim 15, wherein the sixth portion of sub-units of the NGL fractionation plant comprises at least two solvent regeneration system heat sources, comprising:
a first solvent regeneration system heat source that comprises a heat exchanger that is thermally coupled to an outlet stream of an ADIP regeneration section overhead stream; and
a second solvent regeneration system heat source that comprises a heat exchanger that is thermally coupled to an outlet stream of an ADIP regeneration section bottoms.

28. The method of claim 15, wherein the at least one second heat source comprises at least one propane system heat source that comprises a heat exchanger that is thermally coupled to an outlet stream of a depropanizer overhead stream.

* * * * *